US012756270B2

(12) United States Patent
Buckley et al.

(10) Patent No.: US 12,756,270 B2
(45) Date of Patent: Oct. 6, 2026

(54) MULTI-MOTOR ELECTRICAL GENERATOR SYSTEM

(71) Applicant: INY LLC, The Woodlands, TX (US)

(72) Inventors: Christopher Buckley, Montgomery, TX (US); Joseph McFarland, Newaygo, MI (US); Brian Boguski, Milford, OH (US)

(73) Assignee: INY LLC, The Woodlands, TX (US)

( * ) Notice: Subject to any disclaimer, the term of this patent is extended or adjusted under 35 U.S.C. 154(b) by 0 days.

(21) Appl. No.: 19/291,898

(22) Filed: Aug. 6, 2025

(65) Prior Publication Data

US 2026/0045853 A1 Feb. 12, 2026

Related U.S. Application Data

(60) Provisional application No. 63/680,903, filed on Aug. 8, 2024.

(51) Int. Cl.
*H02K 7/18* (2006.01)
*F02B 63/04* (2006.01)
*H02K 7/116* (2006.01)

(52) U.S. Cl.
CPC ......... *H02K 7/1815* (2013.01); *F02B 63/042* (2013.01); *H02K 7/116* (2013.01)

(58) Field of Classification Search
CPC ...... H02K 7/1815; H02K 7/116; F02B 63/042
See application file for complete search history.

(56) References Cited

U.S. PATENT DOCUMENTS

| | | | | |
|---|---|---|---|---|
| 4,691,119 A * | 9/1987 | McCabria | H02K 7/116 310/112 |
| 9,991,763 B1 * | 6/2018 | Downs | B64D 27/10 |
| 10,670,116 B2 * | 6/2020 | Han | H02K 7/183 |
| 2005/0012339 A1 | 1/2005 | Mikhail et al. | |
| 2020/0332784 A1 * | 10/2020 | Zhang | H02K 7/116 |

FOREIGN PATENT DOCUMENTS

| | | | |
|---|---|---|---|
| DE | 102021209339 A1 * | 4/2022 | F02B 61/06 |
| GB | 2490816 A * | 11/2012 | H02K 16/025 |

OTHER PUBLICATIONS

Search Report and Written Opinion issued for International Patent Application No. PCT/US2025/040934, dated Oct. 28, 2025, 11 pages.

* cited by examiner

*Primary Examiner* — Viet P Nguyen
(74) *Attorney, Agent, or Firm* — Haynes and Boone, LLP; Mark A. Tidwell

(57) ABSTRACT

A power generation system has an engine disposed to drive a generator assembly having a plurality of electric generators supported on a gearbox housing. The gearbox housing encloses a gear assembly with an input driveshaft extending along a primary gear assembly axis. A drive gearset mounted on the input driveshaft is coupled to a plurality of output gearsets, each of which mounted on a separate gear assembly output driveshaft. Each gear assembly output driveshaft is parallel with but spaced radially outward from the primary gear assembly axis. At least one electric generator is mechanically coupled to each of the gear assembly output driveshafts.

28 Claims, 20 Drawing Sheets

MULTI-MOTOR ELECTRICAL GENERATOR SYSTEM

CROSS-REFERENCE TO RELATED APPLICATIONS

This application claims priority to U.S. Provisional Pat. App. No. 63/680,903, filed Aug. 8, 2024, the disclosure of which is incorporated by reference herein in its entirety.

TECHNICAL FIELD

This disclosure relates to power generation, and more particularly, to generation of electricity for industrial uses.

BACKGROUND

Traditional electrical generators often rely on a single prime mover such a gas engine, diesel engine or gas turbine to convert mechanical energy into electrical energy by driving a single electrical generator to produce electricity. However, there are limitations in efficiency, scalability, and operational flexibility with such systems.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Disclosed herein is an electric power generation system utilizing a plurality of electric generators geared to a single prime mover where the plurality of electric generators collaborate to generate electricity efficiently and adaptively based on varying conditions and power requirements.

Figure 1:
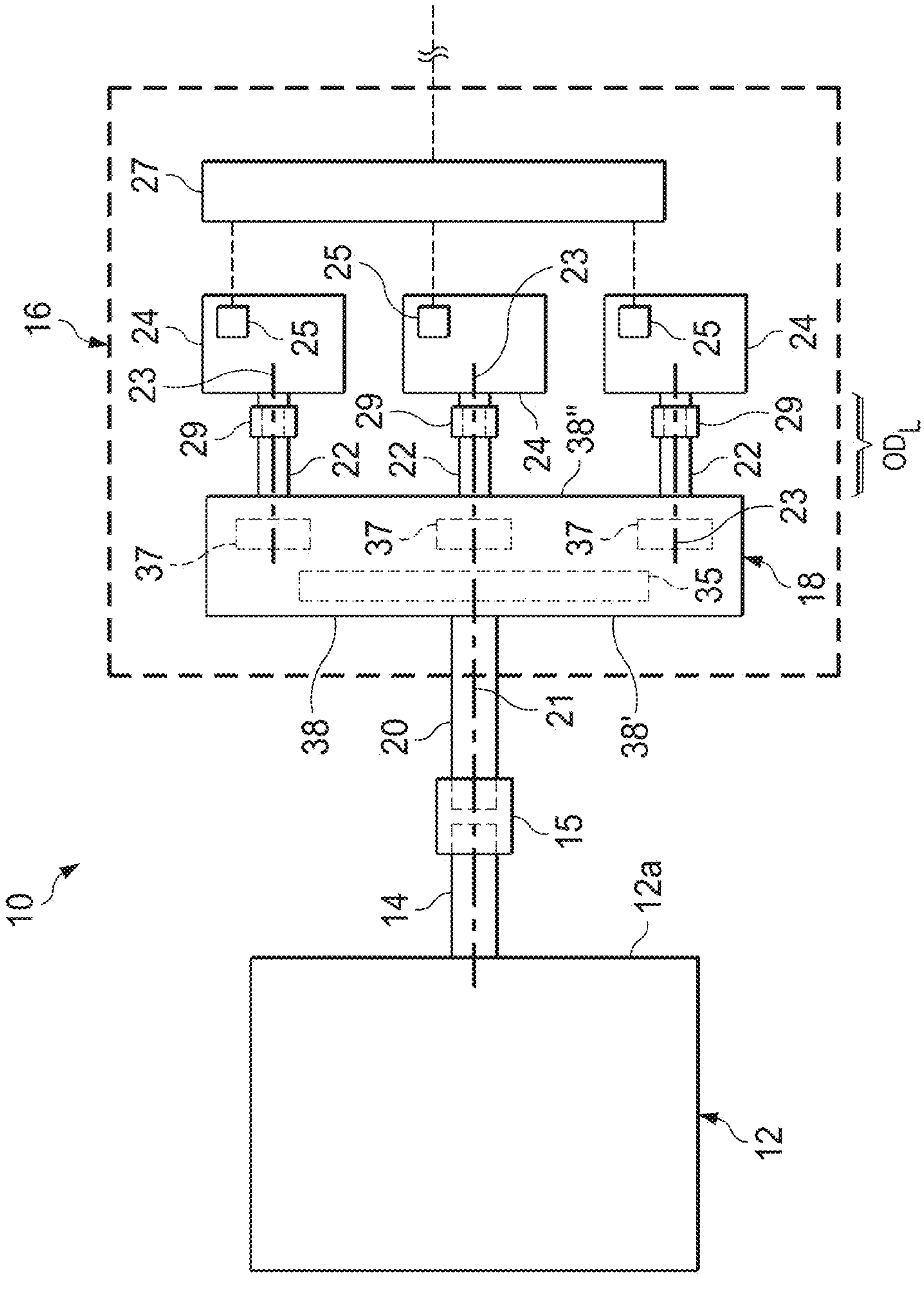
FIG. 1 illustrates a power generation system powered having a single prime mover driving a plurality of electric generators in parallel.
Figure 6:
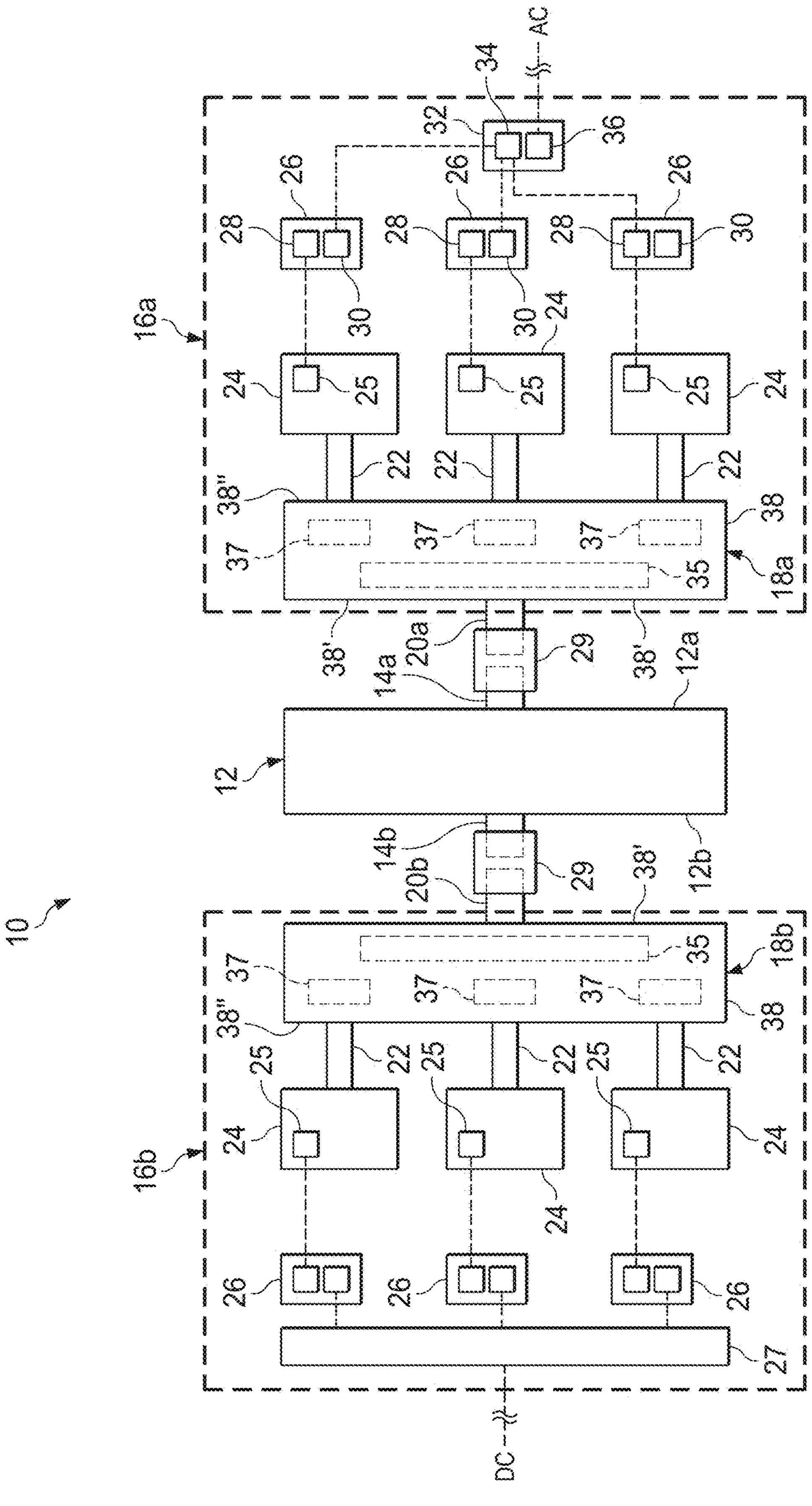
FIG. 6 illustrates a power generation system powered having a single prime mover driving a plurality of electric generators from both ends of the prime mover.

FIG. 1 illustrates an electrical power generation system (10) powered by a prime mover or engine (12) that drives a generator assembly (16) to produce electricity. Engine 12 is not limited to a particular type of engine, but may include gas engines, diesel engines and gas turbines. Engine 12 may be characterized as having at least a first end 12*a* with an output driveshaft (14) extending from a first end 12*a* of engine 12 and coupled to a generator assembly 16. Output driveshaft (14) may be coupled to generator assembly 16 by a coupling 15. In some embodiments as best seen in FIG. 6, in order to achieve load balancing on engine 12, engine 12 may be characterized as having a second end 12*b* with an output driveshaft (14) extending from second end 12*b* of engine 12. In such an arrangement a first generator assembly 16*a* is coupled to output driveshaft 14 extending from first end 12*a* of engine 12, and a second generator assembly 16*b* is coupled to output driveshaft 14 extending from second end 12*b* of engine 12.

In FIG. 1, generator assembly 16 includes a gear assembly 18 and a plurality of primary electric generators (24). Gear assembly (18) has a gear assembly input driveshaft (20) extending along a primary gear assembly axis (21) and coupled to the output driveshaft (14) of engine 12. In addition, gear assembly (18) also includes a plurality of gear assembly output driveshafts (22), each extending along a gear assembly output driveshaft axis (23) that is parallel with, but spaced apart from primary gear assembly axis (21). In one or more embodiments, one or more output driveshafts (22) are parallel with but spaced radially outward from the primary gear assembly axis (21). In addition, to the one or more output driveshafts (22) spaced radially outward from the primary gear assembly axis (21), in one or more embodiments, an additional output driveshaft (22) may also be disposed along the primary gear assembly axis (21).

Each gear assembly output driveshafts (22) is coupled to a separate one of the plurality of primary electric generators (24), thereby allowing the primary electric generators (24) to be operated in parallel. Specifically, gear assembly 18 includes an input or drive gearset 35 and a plurality of output gearsets 37, where the input gearset 35 is mounted on or otherwise coupled to the gear assembly input driveshaft (20)

and meshed with the plurality of output gearsets 37. Each output gearset 37 is mounted on or otherwise coupled to a separate one of the output driveshaft (22) in order to drive the electric generator 24 to which the output driveshaft 22 is coupled. Where an additional output driveshaft (22) is also disposed along the primary gear assembly axis (21), in one or more embodiments, the output gearset for the additional output driveshaft (22) may be eliminated with the additional output driveshaft (22) coupled directly to the input gearset 35 or the gear assembly input driveshaft (20) without being meshed to the input gearset 35.

In one or more embodiments, one or more output gearsets 37 is a planetary gearset.

In one or more embodiments, input gearset is a planetary gearset, while in other embodiments, input gearset is a spur gear.

In one or more embodiments, input gearset 35 and the plurality of output gearsets 37 are enclosed in a gearbox housing 38 having a first side 38' and an opposing second side 38", where first side 38' and second side 38" are each perpendicular to primary gear assembly axis (21). In one or more embodiments, gear assembly input driveshaft (20) may extend from the first side 38' of gearbox housing 38 and the plurality of gear assembly output driveshafts (22) may extend from second side 38" of gearbox housing 38. In other embodiments, one or more of the gear assembly input driveshaft (20) and gear assembly output driveshafts (22) may be internal within gearbox housing 38 and simply arranged so as to be perpendicular to a respective first side 38' or second side 38". In one or more embodiments, a plurality of primary electric generators (24) may be mounted on or otherwise supported by on the second side 38" of gearbox housing 38. In one or more embodiments, first side 38' and second side 38" are parallel with one another and perpendicular to primary gear assembly axis 21.

The plurality of electric generators may comprise AC generators, DC generators or a combination of both AC generators and DC generators. Each electric generator 24 includes an electrical output terminal 25.

In one or more embodiments where electric generator 24 is an AC generator, electrical output terminal 25 is an AC output terminal. In other embodiments where electric generator 24 is an DC generator, electrical output terminal 25 is a DC output terminal. In such case, it will be appreciated that for DC signals, no frequency synching is required and thus, the electrical output terminal 25 can be directly coupled to a DC busbar 27.

In yet other embodiments, a first portion of the plurality of electric generator 24 may be AC generators and a second portion of the plurality of electric generator 24 may be DC generators. By having a plurality of comparatively smaller electric generators as described herein, power generation system (10) can include both DC electric generators and AC electric generators all powered by a single prime mover 12 via gear assembly 18, increasing the flexibility of the overall system to produce both AC and DC output from the single prime mover 12. In this regard, the plurality of electric generators 24 also offer redundancy in the overall system.

Moreover, output gearsets 37 may be selected to achieve a particular signal characteristic. In this regard, the output gearsets 37 may differ among the plurality of output gearsets 37. For example, a first portion of output gearsets 37*a* may have a first gear ratio selected to achieve a first frequency for the output signal and a second portion of output gearsets 37*b* may have a second gear ratio different than the first gear ratio, where the second portion of output gearsets 37*b* is selected to achieve a second frequency for the output signal where the second frequency is different than the first frequency. More broadly, a first portion of output gearsets 37*a* having a first gear ratio may be selected to achieve a first output signal characteristic and a second portion of output gearsets 37*b* having a second gear ratio different than the first gear ration may be selected to achieve a second output signal characteristic where the second output signal characteristic is different than the first output signal characteristic. The foregoing underscores the flexibility of power generation system (10) while still minimizing the overall footprint of the system.

In other words, the gear assembly 18 can be utilized, based on gearing to increase, decrease or keep RPM constant (if gears are1:1) depending on the desired signal frequency output for the electric generators 24. In some embodiments, gear assembly 18 may utilize one or more planetary gearsets. In some embodiments, input gearset 35 may be a central bull gear or sun gear, while output gearsets 37 may be spur gears or planetary gearsets disposed radially outward from input gearset 35. In this regard, a planetary gearsets about a bull gear may be used to significantly change the gear ratio, depending on the rpm desired to achieve a desired signal output.

In any event, in FIG. 1, where electrical output terminal 25 is a DC output terminal and thus no frequency synching is required, electrical output terminal 25 may be electrically coupled to a DC busbar 27.

In one or more embodiments, one or more electric generators 24 may also include an engagement mechanism 29 to selectively engage and disengage such electric generator (24) from driving engagement with gear assembly (18). Engagement mechanism 29 is not limited to a particular type or location so long as each individual electric generator 24 can be engaged and disengaged from driving engagement with gear assembly (18). In each case, such engagement mechanism 29 may be electrically activated, hydraulically activated, or magnetically or pneumatically activated, such as for example, engagement mechanism may be an electric clutch, a hydraulic clutch or pneumatic clutch or magnetic clutch. In any event, engagement mechanisms 29 may be selectively activated to engage and disengage the shaft along which they are mounted to alter the output of power generation system 10. For example, in some embodiments, all engagement mechanisms 29 may be engaged to increase the electrical output of power generation system 10, while in other embodiments, only a portion of the engagement mechanism 29 may be engaged, reducing the electrical output of power generation system 10.

Figure 2:
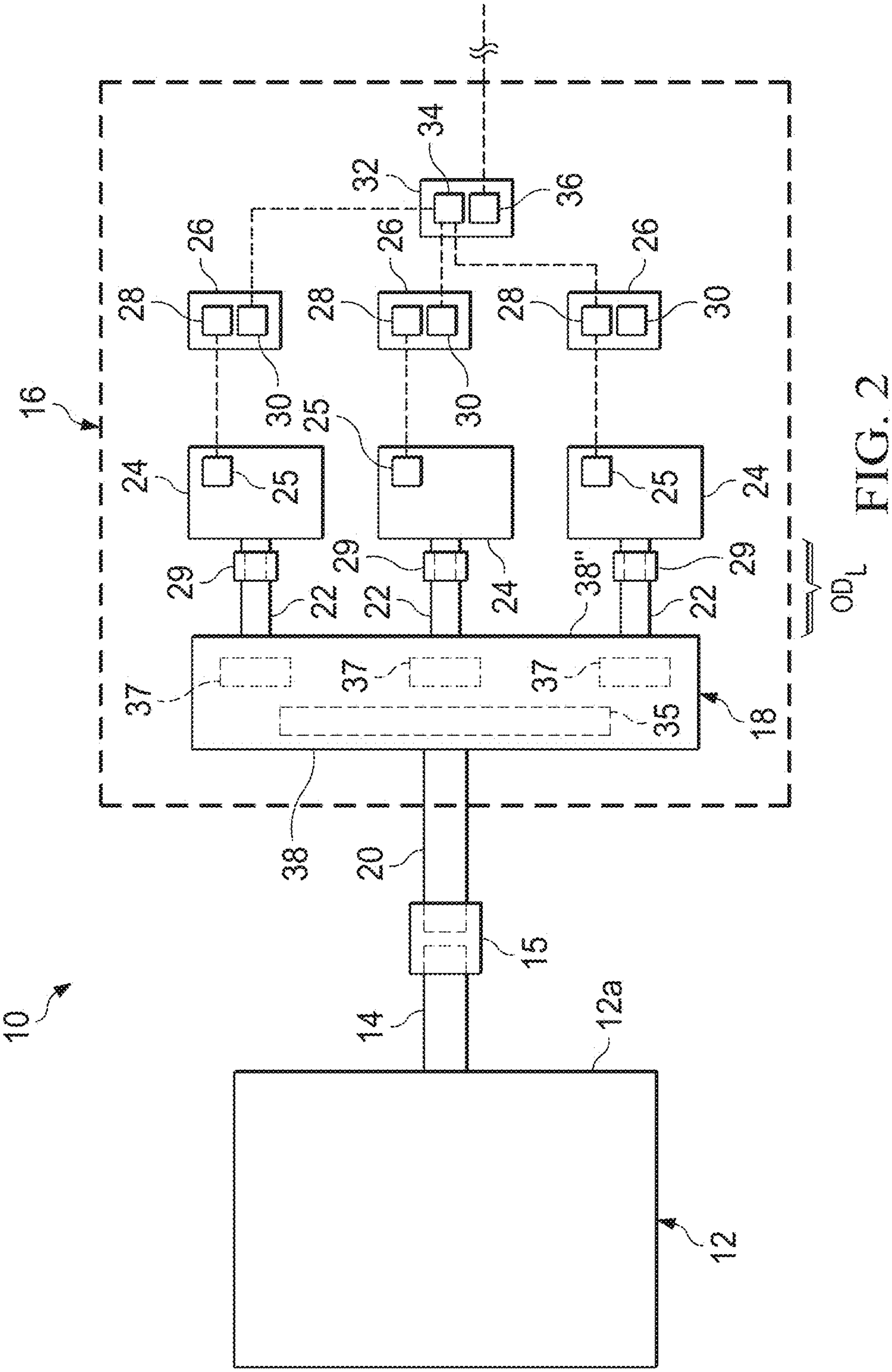
FIG. 2 illustrates a power generation system powered having a single prime mover driving a plurality of AC electric generators in parallel.

FIG. 2 is similar to FIG. 1, but in FIG. 2, each electric generator 24 is an AC generator, such that electrical output terminal 25 is an AC output terminal. In this embodiment, a plurality of rectifiers 26 are illustrated, each having a rectifier electrical input 28 and a rectifier electrical output 30 where the rectifier electrical input 28 is in electrical communication with the electrical output terminal 25 of an electric generator 24. In this illustrated embodiment, electrical output terminal 25 is an AC output terminal, rectifier electrical input 28 is an AC input terminal, and rectifier electrical output 30 is a DC terminal.

More generally, the power generation system (10) of FIG. 2 is powered by a prime mover or engine (12) that is coupled to a generator assembly (16) by an output driveshaft (14) extending from a first end 12*a* of engine 12. Generator assembly 16 includes a gear assembly 18 and a plurality of primary electric generators (24). Gear assembly (18) has a gear assembly input driveshaft (20) extending along a primary gear assembly axis (21) and coupled to the output driveshaft (14) of engine 12. In addition, gear assembly (18) also includes a plurality of gear assembly output driveshafts (22), each extending along a gear assembly output driveshaft axis (23) that is parallel with, but spaced apart from primary gear assembly axis (21). In one or more embodiments, one or more output driveshafts (22) are spaced radially outward from the primary gear assembly axis (21). In addition to the one or more output driveshafts (22) spaced radially outward from the primary gear assembly axis (21), in one or more embodiments, an additional output driveshaft (22) may also be disposed along the primary gear assembly axis (21). Each gear assembly output driveshafts (22) is coupled to a separate one of the plurality of primary electric generators (24), thereby allowing the primary electric generators (24) to be operated in parallel. Gear assembly 18 includes an input or drive gearset 35 and a plurality of output gearsets 37, where the input gearset 35 is mounted on or otherwise coupled to the gear assembly input driveshaft (20) and meshed with the plurality of output gearsets 37. Each output gearset 37 is mounted on or otherwise coupled to a separate one of the output driveshaft (22) in order to drive the electric generator 24 to which the output driveshaft 22 is coupled. In one or more embodiments, input gearset 35 and the plurality of output gearsets 37 are enclosed in a gearbox housing 38 having a first side 38' and an opposing second side 38", where first side 38' and second side 38" are each perpendicular to primary gear assembly axis (21). In one or more embodiments, gear assembly input driveshaft (20) may extend from the first side 38' of gearbox housing 38 and the plurality of gear assembly output driveshafts (22) may extend from second side 38" of gearbox housing 38. One or more driveshafts may include an engagement mechanism 29 to selectively engage and disengage electric generators (24) from driving engagement with gear assembly (18) in order to achieve a desired electrical output.

In some embodiments where it is desired to produce a DC signal, the rectifier electrical output 30 of each of the plurality of rectifiers 26 can be coupled to a DC busbar 27 as shown in FIG. 1. In other embodiments, where it is desired to produce a single AC signal from a plurality of AC electric generators 24, as shown in FIG. 2, the rectifier electrical output 30 of two or more rectifiers 26 can be electrically coupled, either directly or through an intervening busbar such as busbar 27 (not shown in FIG. 2), to an inverter 32, and in particular, the input terminal 34 of an inverter 32. Inverter 32 can be utilized to convert the incoming DC signal to a combined AC signal for output at output terminal 36 of inverter 32.

Figure 3:
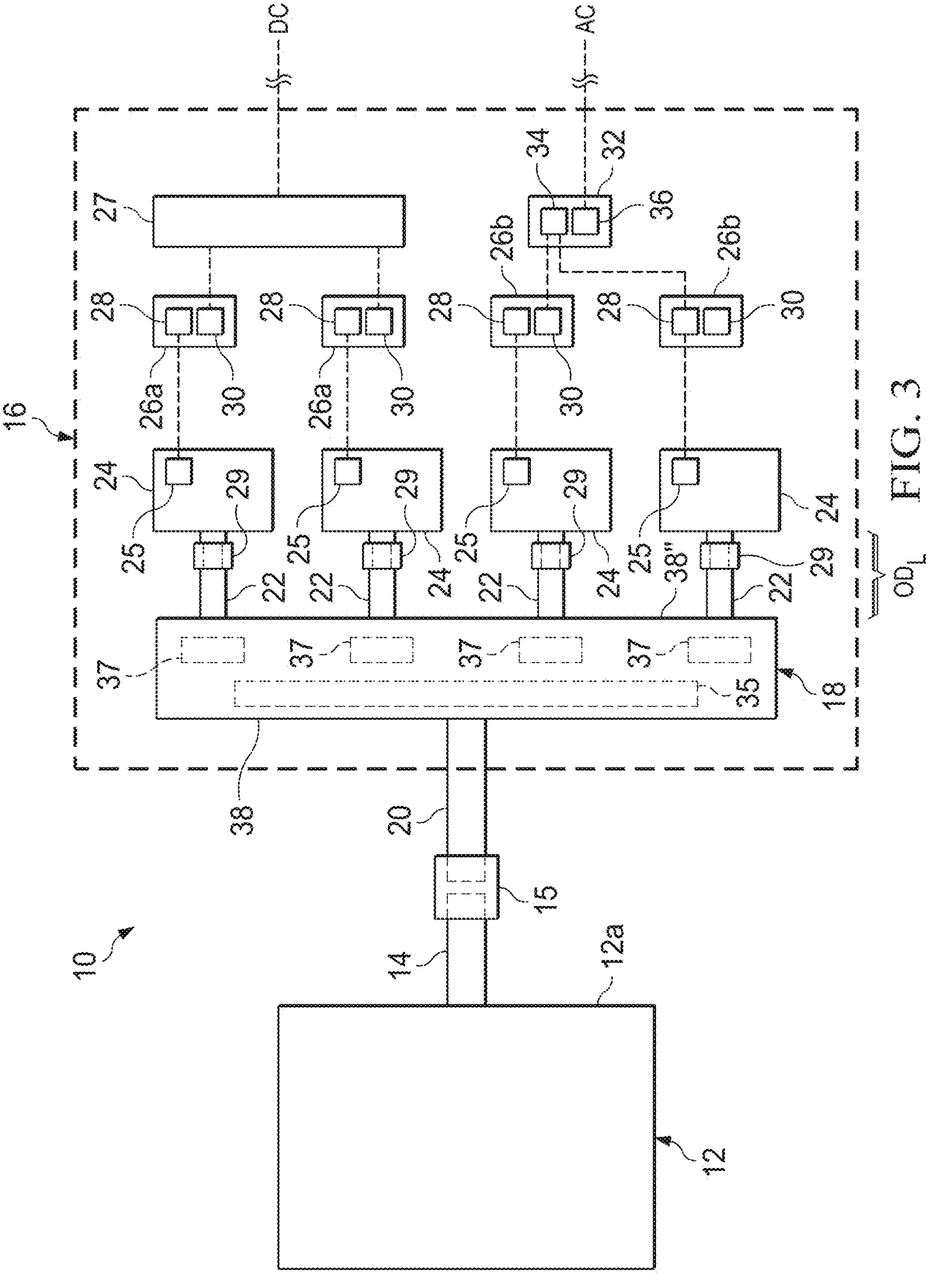
FIG. 3 illustrates a power generation system with a plurality of AC electric generators producing both AC and DC power in parallel.

In FIG. 3, demonstrates the flexibility of generator assembly 16 in being able to generate both DC and AC signals utilizing a single prime mover 12 and only a single type of electric generator 24, in this case, AC electric generators 24. In this embodiment, a plurality of AC electric generators 24 are driven by gear assembly 18, each producing an AC signal. A plurality of rectifiers 26 are utilized to convert the AC signals to DC signals as described above with respect to FIG. 2. In the illustrated embodiment, a first portion of the rectifiers **26*a* are electrically coupled to a DC busbar 27 via the respective electrical output terminals 30. In addition, a second portion of the rectifiers 26*b* are electrically coupled to an inverter 32, and in particular, the input terminal 34 of an inverter 32. Inverter 32 can be utilized to convert the incoming DC signal to an AC signal for output at output terminal 36 of inverter 32**.

More generally, the power generation system (10) of FIG. 3 is powered by a prime mover or engine (12) that is coupled to a generator assembly (16) by an output driveshaft (14) extending from a first end **12*a* of engine 12. Generator assembly 16 includes a gear assembly 18 and a plurality of primary electric generators (24). Gear assembly (18) has a gear assembly input driveshaft (20) extending along a primary gear assembly axis (21) and coupled to the output driveshaft (14) of engine 12. In addition, gear assembly (18) also includes a plurality of gear assembly output driveshafts (22), each extending along a gear assembly output driveshaft axis (23) that is parallel with, but spaced apart from primary gear assembly axis (21). In one or more embodiments, one or more output driveshafts (22) are spaced radially outward from the primary gear assembly axis (21). In addition to the one or more output driveshafts (22) spaced radially outward from the primary gear assembly axis (21), in one or more embodiments, an additional output driveshaft (22) may also be disposed along the primary gear assembly axis (21). Each gear assembly output driveshafts (22) is coupled to a separate one of the plurality of primary electric generators (24), thereby allowing the primary electric generators (24) to be operated in parallel. Gear assembly 18 includes an input or drive gearset 35 and a plurality of output gearsets 37, where the input gearset 35 is mounted on or otherwise coupled to the gear assembly input driveshaft (20) and meshed with the plurality of output gearsets 37. Each output gearset 37 is mounted on or otherwise coupled to a separate one of the output driveshaft (22) in order to drive the electric generator 24 to which the output driveshaft 22 is coupled. In one or more embodiments, input gearset 35 and the plurality of output gearsets 37 are enclosed in a gearbox housing 38 having a first side 38' and an opposing second side 38", where first side 38' and second side 38" are each perpendicular to primary gear assembly axis (21). In one or more embodiments, gear assembly input driveshaft (20) may extend from the first side 38' of gearbox housing 38 and the plurality of gear assembly output driveshafts (22) may extend from second side 38" of gearbox housing 38. One or more driveshafts may include an engagement mechanism 29 to selectively engage and disengage electric generators (24) from driving engagement with gear assembly (18**) in order to achieve a desired electrical output.

Figure 4:
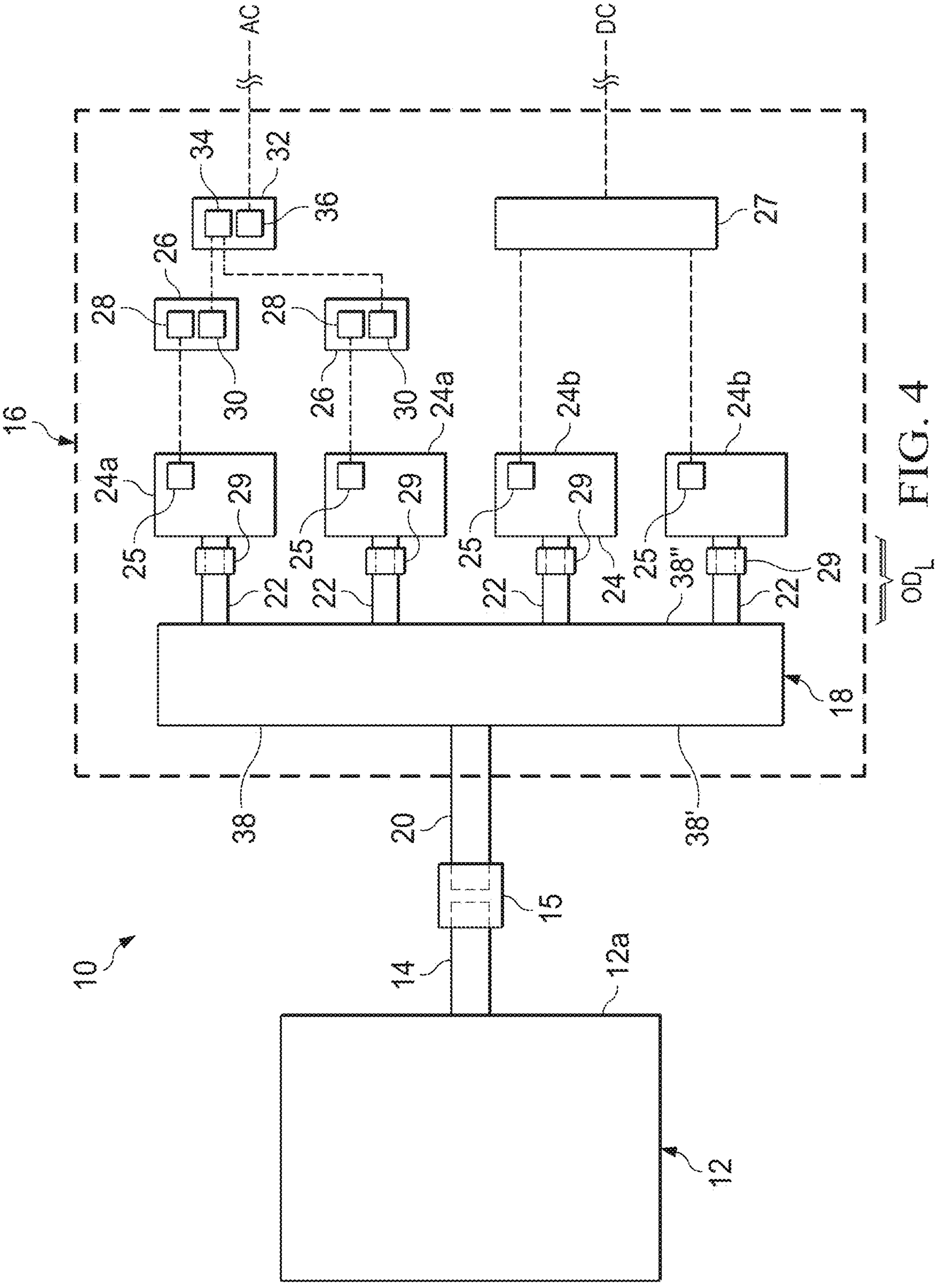
FIG. 4 illustrates a power generation system powered having a single prime mover driving both AC electric generators and DC electric generators.

FIG. 4 likewise demonstrates the flexibility of generator assembly 16 in being able to generate both DC and AC signals utilizing a single prime mover 12. In this illustration, a first plurality of AC electric generators **24*a* and a second plurality of DC electric generators 24*b* are all driven by gear assembly 18. In the illustrated embodiment, the electric generators 24 are arranged in parallel. A plurality of rectifiers 26 are utilized to convert the AC signals from electric generators 24*a* to DC signals, after which the output DC signals from the plurality of rectifiers 26 are combined and changed to an AC output signal by inverter 32. Since the second plurality of electric generators 24*b* are DC generators, they can be directly coupled to DC busbar 27** for output of the DC signal.

More generally, the power generation system (10) of FIG. 4 is powered by a prime mover or engine (12) that is coupled to a generator assembly (16) by an output driveshaft (14) extending from a first end **12*a* of engine 12. Generator assembly 16 includes a gear assembly 18 and a plurality of primary electric generators (24). Gear assembly (18) has a gear assembly input driveshaft (20) extending along a primary gear assembly axis (21) and coupled to the output driveshaft (14) of engine 12. In addition, gear assembly (18) also includes a plurality of gear assembly output driveshafts (22), each extending along a gear assembly output driveshaft axis (23) that is parallel with, but spaced apart from primary gear assembly axis (21). In one or more embodiments, one or more output driveshafts (22) are spaced radially outward from the primary gear assembly axis (21). In addition to the one or more output driveshafts (22) spaced radially outward from the primary gear assembly axis (21), in one or more embodiments, an additional output driveshaft (22) may also be disposed along the primary gear assembly axis (21). Each gear assembly output driveshafts (22) is coupled to a separate one of the plurality of primary electric generators (24), thereby allowing the primary electric generators (24) to be operated in parallel. Gear assembly 18 includes an input or drive gearset 35 and a plurality of output gearsets 37, where the input gearset 35 is mounted on or otherwise coupled to the gear assembly input driveshaft (20) and meshed with the plurality of output gearsets 37. Each output gearset 37 is mounted on or otherwise coupled to a separate one of the output driveshaft (22) in order to drive the electric generator 24 to which the output driveshaft 22 is coupled. In one or more embodiments, input gearset 35 and the plurality of output gearsets 37 are enclosed in a gearbox housing 38 having a first side 38' and an opposing second side 38", where first side 38' and second side 38" are each perpendicular to primary gear assembly axis (21). In one or more embodiments, gear assembly input driveshaft (20) may extend from the first side 38' of gearbox housing 38 and the plurality of gear assembly output driveshafts (22) may extend from second side 38" of gearbox housing 38. One or more driveshafts may include an engagement mechanism 29 to selectively engage and disengage electric generators (24) from driving engagement with gear assembly (18**) in order to achieve a desired electrical output.

Figure 5:
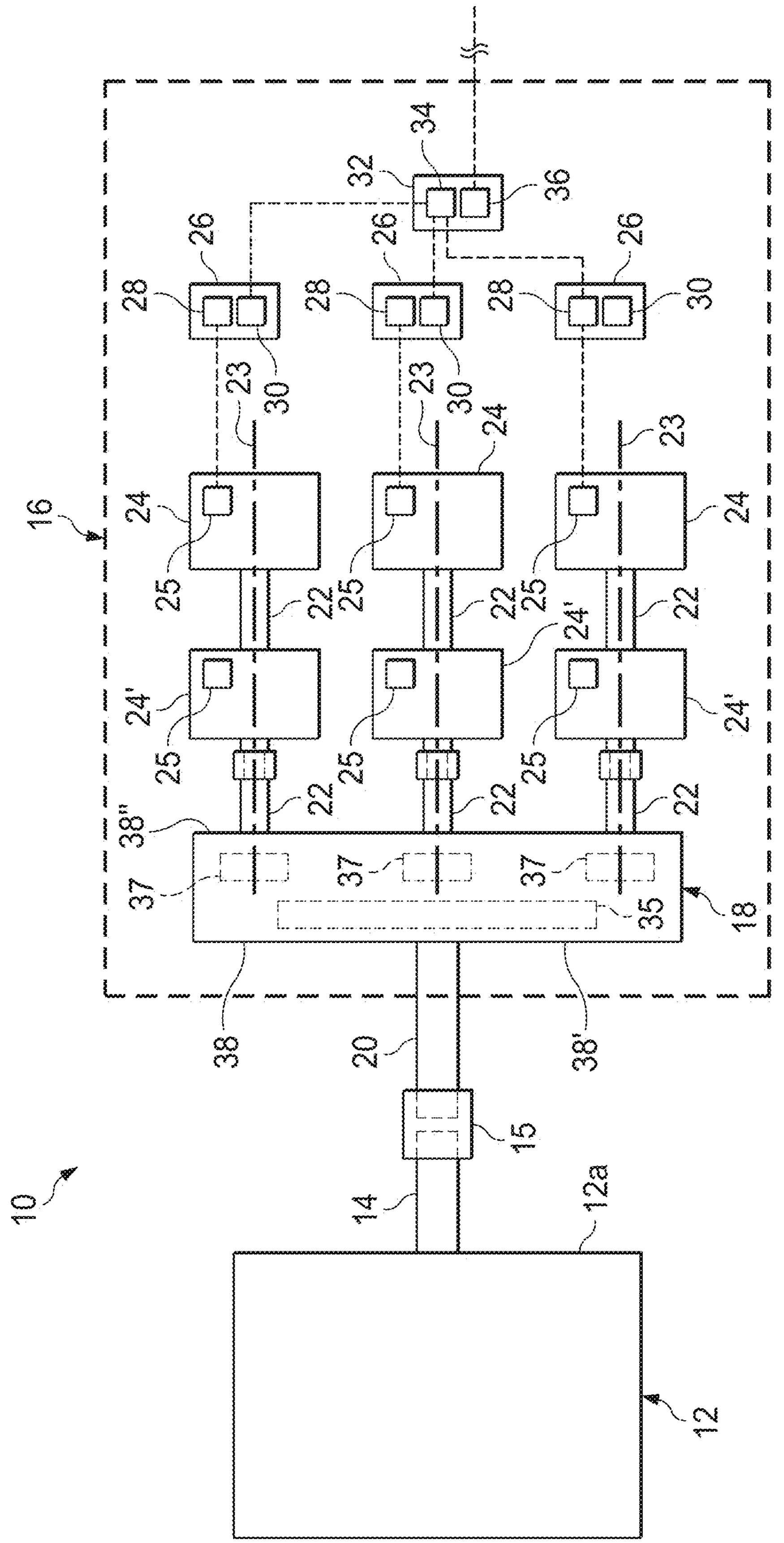
FIG. 5 is similar to the power generation system of FIG. 1, but includes electric generators in series as well as in parallel.

In FIG. 5, a secondary electric generator 24' is shown disposed along each gear assembly output driveshaft axis 23 such that each output driveshaft drives both a secondary electric generator 24' as well as primary electric generator 24. This allows the voltage output from any given pair of primary and secondary electric generators 24, 24' to be increased. In other words, multiple electric generators 24, 24' can be deployed in series to increase total voltage output, thereby enhancing the overall system's capacity to deliver power. For example, if each generator 24, 24' produces 120V DC, then in series the primary and secondary electric generators 24, 24' produce 240V DC. Of course, in addition to multiple electric generators 24, 24' being arranged in series, multiple sets of electric generators 24, 24' can also be arranged in parallel, such as the three sets illustrated in parallel in FIG. 5.

More generally, the power generation system (10) of FIG. 5 is powered by a prime mover or engine (12) that is coupled to a generator assembly (16) by an output driveshaft (14) extending from a first end 12*a* of engine 12. Generator assembly 16 includes a gear assembly 18 and a plurality of primary electric generators (24). Gear assembly (18) has a gear assembly input driveshaft (20) extending along a primary gear assembly axis (21) and coupled to the output driveshaft (14) of engine 12. In addition, gear assembly (18) also includes a plurality of gear assembly output driveshafts (22), each extending along a gear assembly output driveshaft axis (23) that is parallel with, but spaced apart from primary gear assembly axis (21). In one or more embodiments, one or more output driveshafts (22) are spaced radially outward from the primary gear assembly axis (21). In addition to the one or more output driveshafts (22) spaced radially outward from the primary gear assembly axis (21), in one or more embodiments, an additional output driveshaft (22) may also be disposed along the primary gear assembly axis (21). Each gear assembly output driveshafts (22) is coupled to a separate one of the plurality of primary electric generators (24), thereby allowing the primary electric generators (24) to be operated in parallel. Gear assembly 18 includes an input or drive gearset 35 and a plurality of output gearsets 37, where the input gearset 35 is mounted on or otherwise coupled to the gear assembly input driveshaft (20) and meshed with the plurality of output gearsets 37. Each output gearset 37 is mounted on or otherwise coupled to a separate one of the output driveshaft (22) in order to drive the electric generator 24 to which the output driveshaft 22 is coupled. In one or more embodiments, input gearset 35 and the plurality of output gearsets 37 are enclosed in a gearbox housing 38 having a first side 38' and an opposing second side 38", where first side 38' and second side 38" are each perpendicular to primary gear assembly axis (21). In one or more embodiments, gear assembly input driveshaft (20) may extend from the first side 38' of gearbox housing 38 and the plurality of gear assembly output driveshafts (22) may extend from second side 38" of gearbox housing 38. One or more driveshafts may include an engagement mechanism 29 to selectively engage and disengage electric generators (24) from driving engagement with gear assembly (18) in order to achieve a desired electrical output.

In FIG. 6, as described above, in order to achieve load balancing on engine 12, an engine 12 output driveshaft (14) may also extend from a second end 12*b* of engine 12, shown as output driveshaft 14*b*. In such an arrangement, a first generator assembly 16*a* includes an input driveshaft 20*a* that is coupled to output driveshaft 14*a* extending from first end 12*a* of engine 12, and a second generator assembly 16*b* includes an input driveshaft 20*b* that is coupled to driveshaft 14*b* extending from second end 12*b* of engine 12. The first and second generator assemblies 16*a*, 16*b* are not limited to a particular configuration. In some embodiments, they may have the same configuration, while in other embodiments, they may have different configurations, thereby enhancing the flexibility of the overall power generation system 10, including without limitation, the various configurations described in FIGS. 1-5.

In one or more embodiments, first generator assembly 16*a* may comprise a plurality of AC electric generators 24 and second generator assembly 16*b* may comprise a plurality of DC electric generators 24. In one or more embodiments, first generator assembly 16*a* may comprise a plurality of AC electric generators 24 and second generator assembly 16*b* may comprise a plurality of AC electric generators 24. In one or more embodiments, first generator assembly 16*a* may comprise a plurality of DC electric generators 24 and second generator assembly 16*b* may comprise a plurality of DC electric generators 24. In one or more embodiments, first generator assembly 16*a* may comprise one of the generator assemblies 16 shown in FIGS. 1-5, and second generator assembly 16*b* may comprise a one of the generator assemblies 16 shown in FIGS. 1-5, which may be the same or different than the generator assembly 16 of first generator assembly 16*a*.

In the illustrated embodiment, each of the electric generators 24 of both the first generator assembly 16*a* and the second generator assembly 16*b* are AC generators. Thus, in both the first generator assembly 16*a* and the second generator assembly 16*b*, a plurality of rectifiers 26 within each of the first generator assembly 16*a* and the second generator assembly 16*b* are utilized to convert the AC signal produced from the electric generators 24 to a DC signal. In the first generator assembly 16*a*, the converted DC signal is then inverted to an AC signal by inverter 32. In the second generator assembly 16*b*, the DC signal from each of the plurality of rectifiers 26 is put on a busbar 27. In this way, load balancing is achieved for engine 12 by having a generator assembly 16 on each end of engine 12, while the power generation system 10 produces both an AC and a DC signal for use.

More generally, the power generation system (10) of FIG. 6 is powered by a prime mover or engine (12) that is coupled to each of generator assemblies (16*a*), 16*b* by a respective output driveshaft (14), 14*b* extending from a first end 12*a* of engine 12 and a second end 12*b* of engine 12, respectively. Each generator assembly 16 includes a gear assembly 18 and a plurality of primary electric generators (24). Each gear assembly (18) has a gear assembly input driveshaft (20) extending along a primary gear assembly axis (21) and coupled to the output driveshaft (14) of engine 12. In addition, each gear assembly (18) also includes a plurality of gear assembly output driveshafts (22), each extending along a gear assembly output driveshaft axis (23) that is parallel with, but spaced apart from primary gear assembly axis (21). In one or more embodiments, one or more output driveshafts (22) are spaced radially outward from the primary gear assembly axis (21). In addition to the one or more output driveshafts (22) spaced radially outward from the primary gear assembly axis (21), in one or more embodiments, an additional output driveshaft (22) may also be disposed along the primary gear assembly axis (21). Each gear assembly output driveshafts (22) is coupled to a separate one of the plurality of primary electric generators (24), thereby allowing the primary electric generators (24) to be operated in parallel. Gear assembly 18 includes an input or drive gearset 35 and a plurality of output gearsets 37, where the input gearset 35 is mounted on or otherwise coupled to the gear assembly input driveshaft (20) and meshed with the plurality of output gearsets 37. Each output gearset 37 is mounted on or otherwise coupled to a separate one of the output driveshaft (22) in order to drive the electric generator 24 to which the output driveshaft 22 is coupled. In one or more embodiments, input gearset 35 and the plurality of output gearsets 37 are enclosed in a gearbox housing 38 having a first side 38' and an opposing second side 38", where first side 38' and second side 38" are each perpendicular to primary gear assembly axis (21). In one or more embodiments, gear assembly input driveshaft (20) may extend from the first side 38' of gearbox housing 38 and the plurality of gear assembly output driveshafts (22) may extend from second side 38" of gearbox housing 38. One or more driveshafts may include an engagement mechanism 29 to selectively engage and disengage electric generators (24) from driving engagement with gear assembly (18) in order to achieve a desired electrical output.

Figure 7:
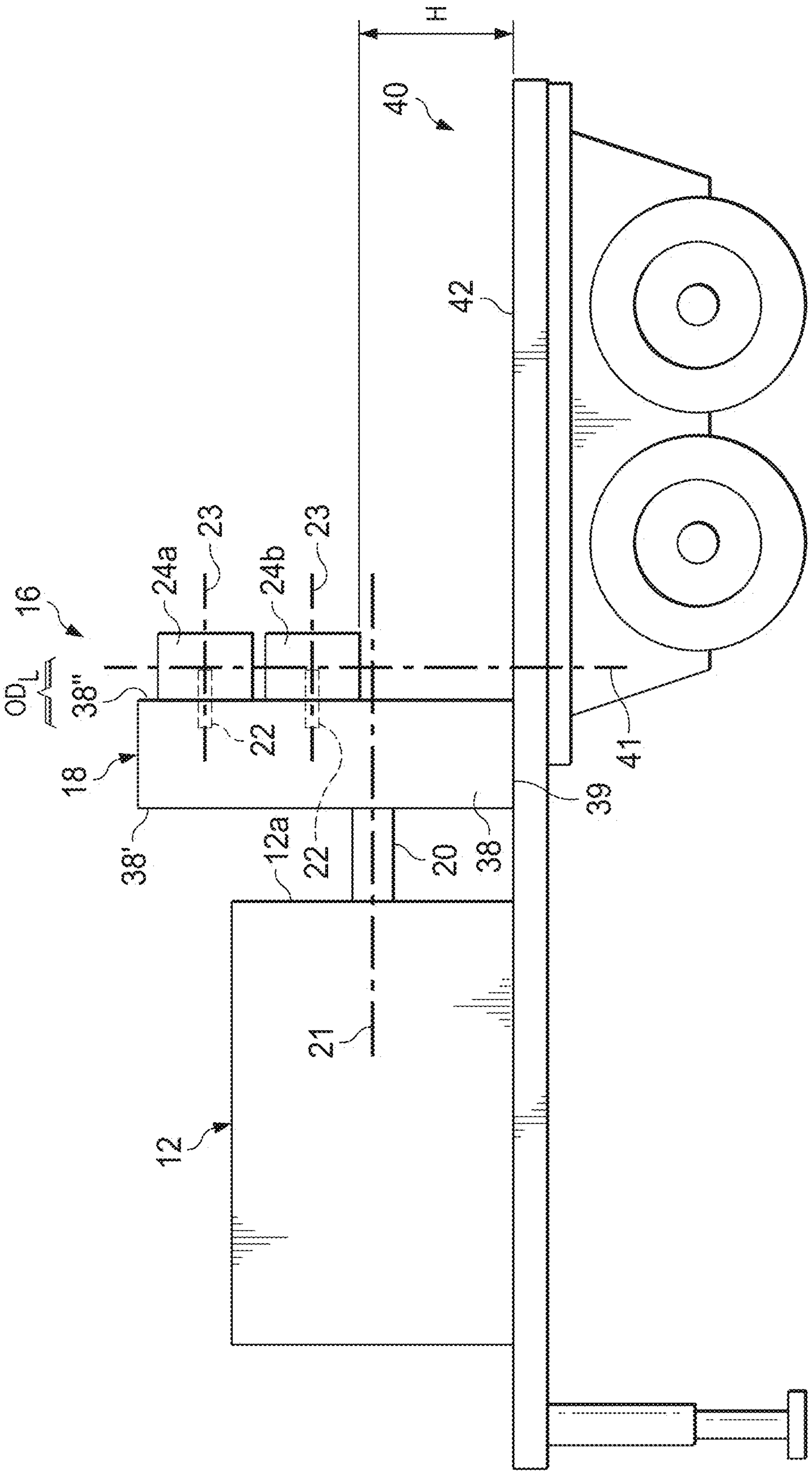
FIG. 7 illustrates a power generation system according to claim 1 mounted on a platform with a gearbox housing supporting the electric generators above the platform.
Figure 11:
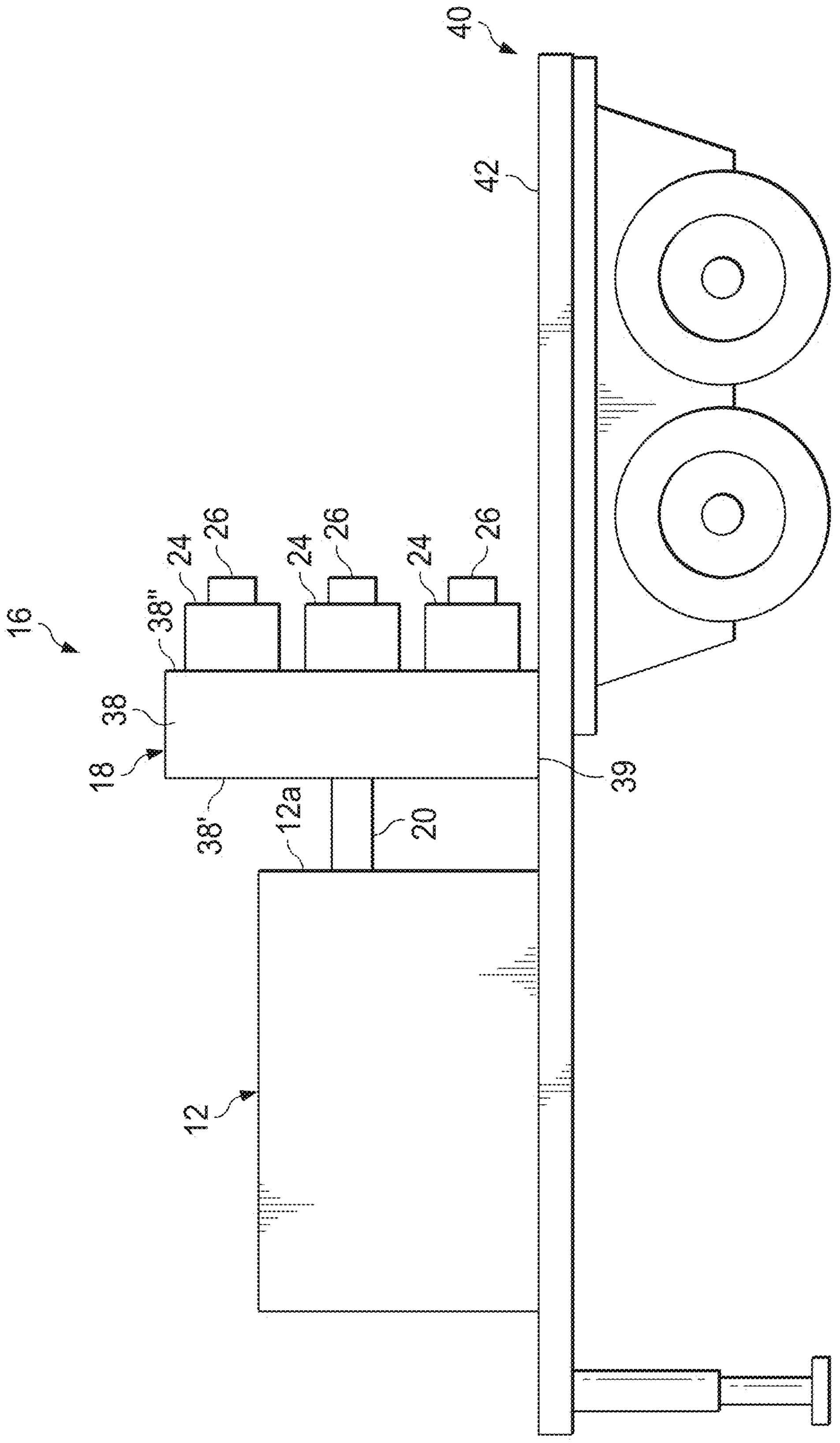
FIG. 11 is similar to FIG. 8 but includes rectifiers supported by a gearbox housing.

With reference to FIG. 7, a generator assembly 16 includes a gear assembly 18 having a gearbox housing 38 enclosing the drive gearset 35 and plurality of output gearsets 37 as described above in FIGS. 1-6. In one or more embodiments, each of the plurality of electric generators 24 is mounted or otherwise supported on the gearbox housing 38. Likewise, in some embodiments as shown in FIG. 11, each of the plurality of rectifiers 26 may be mounted or otherwise supported on the electric generator 24 to which it is electrically coupled.

More generally, illustrated in FIGS. 7-12 is a power generation system (10) mounted on a platform (40) such as a trailer or skid, having a bed (42), wherein the engine 12, gear assembly 18 and plurality of electric generators 24 are mounted on the platform 40. It will be appreciated that by utilizing the plurality of electric generators 24 mounted on the gear assembly 18, the overall footprint of the power generation system 10 on the bed 42 is significantly reduced over prior art power generation systems that typically mount a single large electric generator directly on a trailer bed along with the engine, and position the single large electric generator along the axis of the engine output shaft.

As shown, the gear assembly 18 includes a gearbox housing (38) mounted on the bed 42 and where each of the plurality of electric generators 24 is mounted on the gearbox housing (38) so as to be spaced apart above the bed (42) surface a distance H. Of course, in some embodiments, depending on the gearing arrangement, one or more of the plurality of electric generators 24 may be mounted on gearbox housing 38 so as to be adjacent or directly supported on bed 42 while others of the plurality of electric generators 24 are supported by gearbox housing 38 so as to be above bed 42 as distance H. In the illustrated embodiment, each of the plurality of electric generators 24 is mounted above the primary gear assembly axis 21 along which the engine output driveshaft 14 extends. FIGS. 7-12 also illustrate gear assembly output driveshafts 22 spaced outward from primary gear assembly axis 21.

In any event, it will be appreciated that FIGS. 7-12 illustrate various arrangements for plurality of electric generators 24 as they are supported by gearbox housing 38, and the disclosure is not limited to a particular arrangement.

In FIG. 7, electric generators 24*a*, 24*b* are mounted so as to be spaced apart at least a distance H above the bed 42, but also above primary gear assembly axis 21 along which gear assembly input driveshaft 20 extends. In one or more embodiments, each output driveshaft 22 extends along a separate output driveshaft axis 23, all of which are spaced apart from primary gear assembly axis 21. In some embodiments, each of the output driveshaft 22 are of an output driveshaft length ODL which ODL may be the same for each output driveshaft 22, thereby allowing electric generators 24*a*, 24*b* to be mounted on gearbox housing 38 in the same plane 41 that is perpendicular to primary gear assembly axis 21. In these embodiments, as shown, electric generators 24*a*, 24*b* are mounted on the second side 38" of gearbox housing 38 and each is driven by a separate output driveshaft 22.

Figure 8:
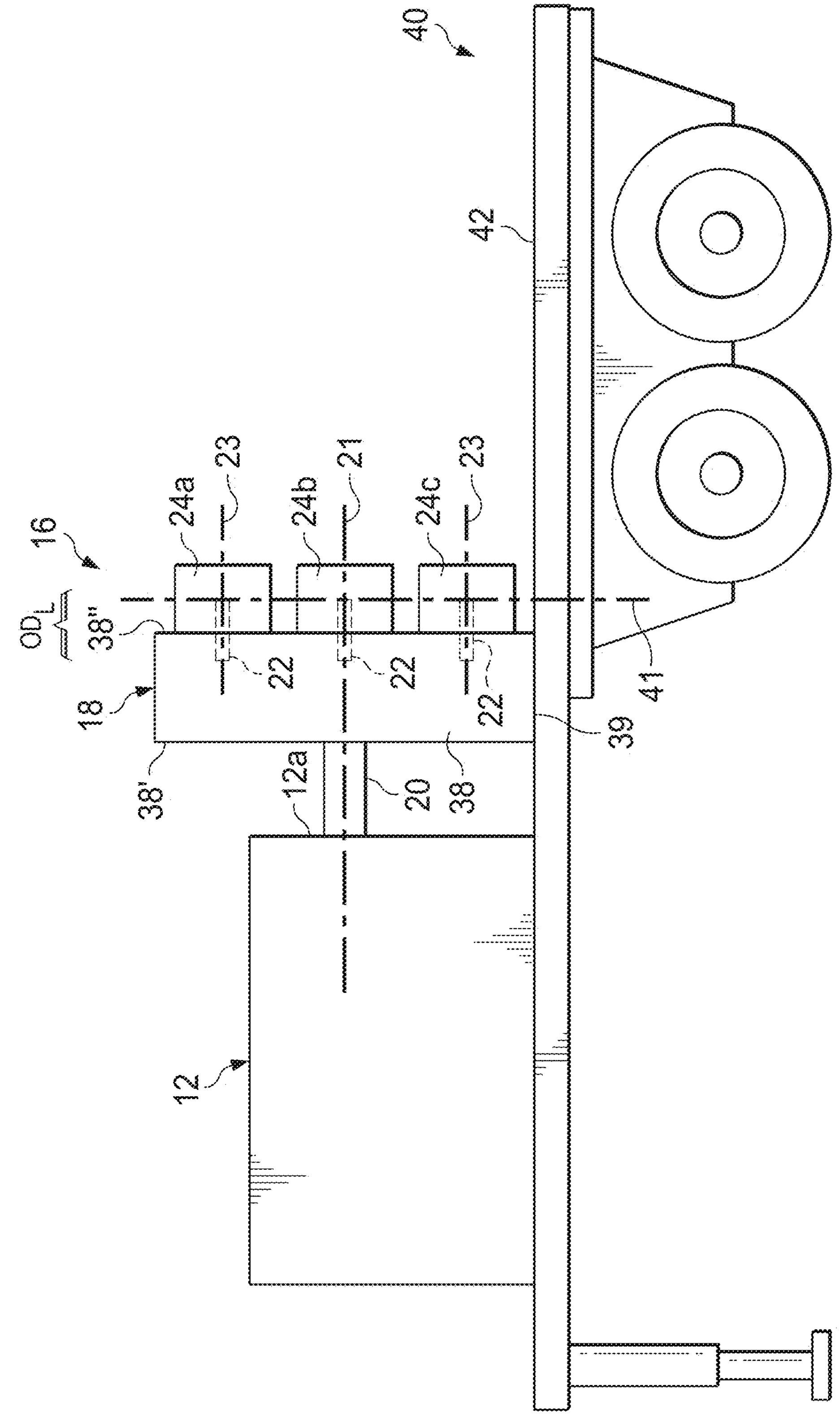
FIG. 8 illustrates a power generation system according to claim 1 mounted on a platform with a gearbox housing supporting the electric generators.

The embodiment of FIG. 8 is similar to FIG. 7, but includes an electric generator 24*c* illustrated adjacent bed 42 while the other electric generators 24*a*, 24*b* are mounted so as to be spaced apart above the bed 42. Moreover, electric generator 24*b* may be mounted along primary gear assembly axis 21 with its respective output driveshaft 22 coupled to gear assembly input driveshaft 20 either directly or through a gearset (not shown).

Figure 9:
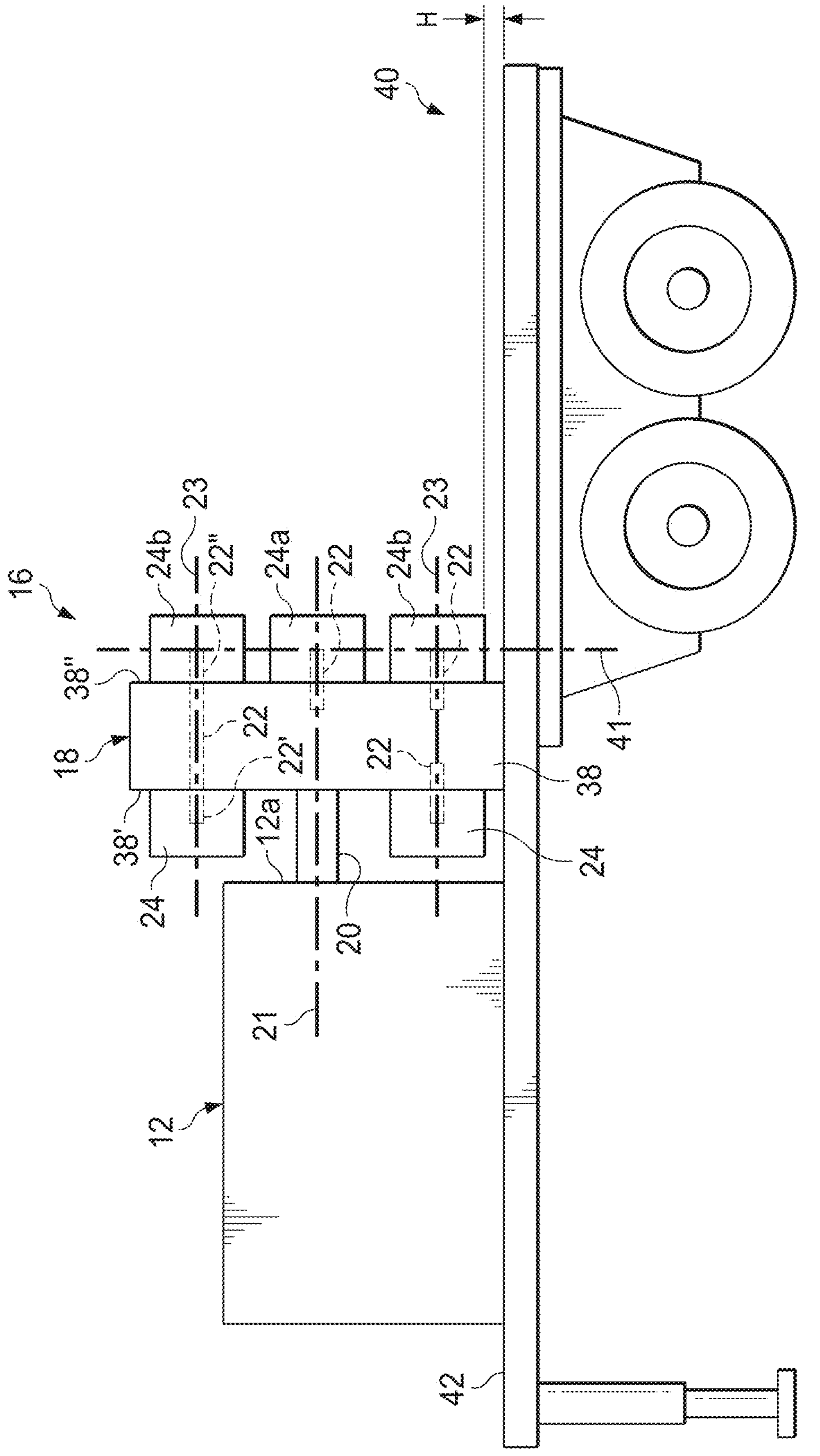
FIG. 9 is similar to FIG. 8 but includes electric generators supported on both sides of a gearbox housing.

In FIG. 9, gearbox housing 38 has a first side 38' and a second side 38" with a plurality of electric generators 24 mounted on each of the first side 38' and second side 38" of gearbox housing 38. In these embodiments, two electric generators may be positioned along the same gear assembly output driveshaft axis 23 so as to oppose one another on their respective first and second sides 38', 38". Moreover, in some embodiments, opposing electric generators 24 may each have its own output driveshaft 22. In some embodiments, a single output driveshaft 22 may be utilized to drive two opposing electric generators 24. In such case, an output driveshaft 22 may have a first end 22' and a second end 22" with an electric generator 24 coupled to each of the first end 22' and second end 22".

As illustrated in FIG. 9 but applicable in any of the power systems 10 described herein, in addition to two or more electric generators 24*b* that may be spaced radially outward from primary gear assembly axis 21, in some embodiments, an additional electric generator 24*a* may also be positioned along primary gear assembly axis 21.

Figure 10:
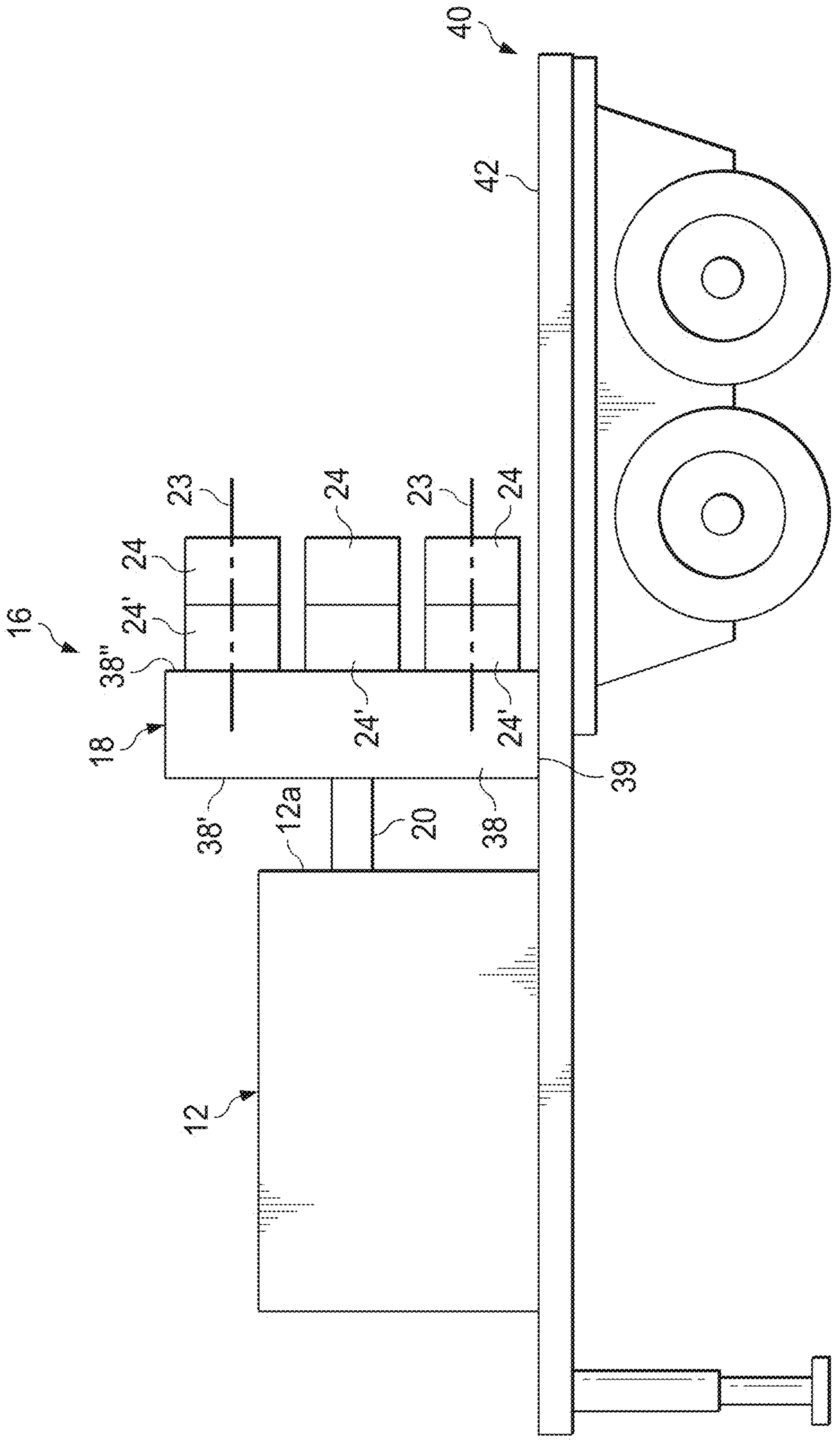
FIG. 10 is similar to FIG. 8 but includes electric generators supported in series on a gearbox housing.

In FIG. 10, two or more electric generators 24', 24 are illustrated as being arranged serially along the same gear assembly output driveshaft axis 23 as described above.

In FIG. 11, each of the plurality of electric generators 24 are illustrated as individually supporting a rectifier 24, thereby minimizing the footprint of power generation system 10, while also ensuring that the rectifiers are likewise supported above the bed 42.

Figure 12:
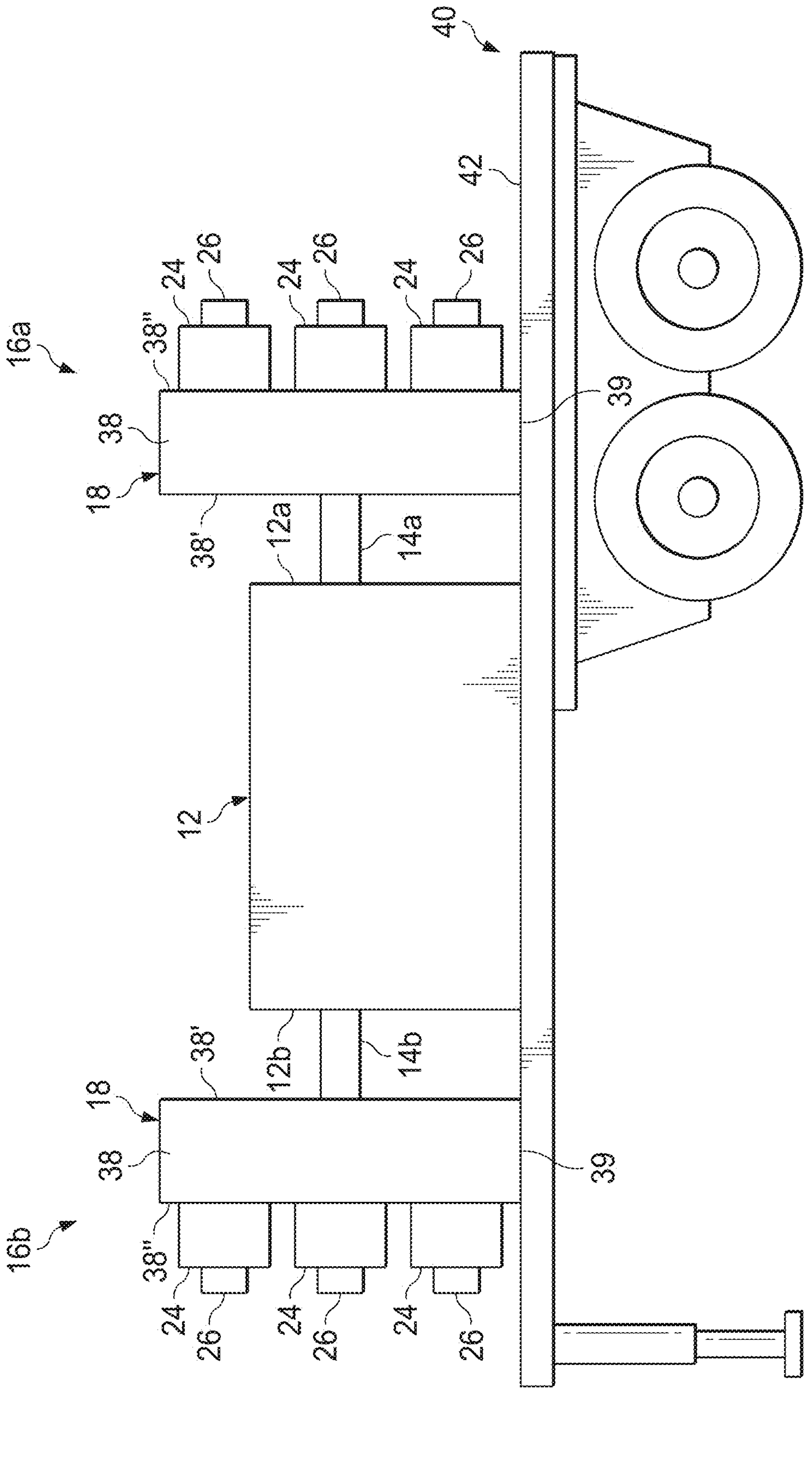
FIG. 12 is similar to FIG. 8, but includes a plurality of electric generators driven by both ends of the prime mover.

In FIG. 12, power generation system 10 includes a first generator assembly 16*a* and a second generator assembly 16*b* as generally described above with respect to FIG. 6. In such an arrangement, a first generator assembly 16*a* includes an input driveshaft 20*a* that is coupled to output driveshaft 14*a* extending from first end 12*a* of engine 12, and a second generator assembly 16*b* includes an input driveshaft 20*b* that is coupled to driveshaft 14*b* extending from second end 12*b* of engine 12. The first and second generator assemblies 16*a*, 16*b* are not limited to a particular configuration. In some embodiments, they may have the same configuration, while in other embodiments, they may have different configurations, thereby enhancing the flexibility of the overall power generation system 10. In one or more embodiments, first generator assembly 16*a* may comprise a plurality of AC electric generators 24 and second generator assembly 16*b* may comprise a plurality of DC electric generators 24. In one or more embodiments, first generator assembly 16*a* may comprise a plurality of AC electric generators 24 and second generator assembly 16*b* may comprise a plurality of AC electric generators 24. In one or more embodiments, first generator assembly 16*a* may comprise a plurality of DC electric generators 24 and second generator assembly 16*b* may comprise a plurality of DC electric generators 24.

FIGS. 13-16 illustrate one embodiment of generator assembly 16. In this embodiment, nine electric generators 24 are shown mounted on gearbox housing 38. In the illustrated embodiment, a plurality of the electric generators 24*b*, 24*c*, 24*d*, 24*e*, 24*f*, 24*g* and 24*h* are each disposed along a gear assembly output driveshaft axis 23 that is spaced radially outward from primary gear assembly axis 21 a distance R1. In some embodiments, R1 is greater than the diameter of electric generator 24. In some embodiments, an additional electric generator 24*a* may also be positioned along primary gear assembly axis 21.

Figure 15:
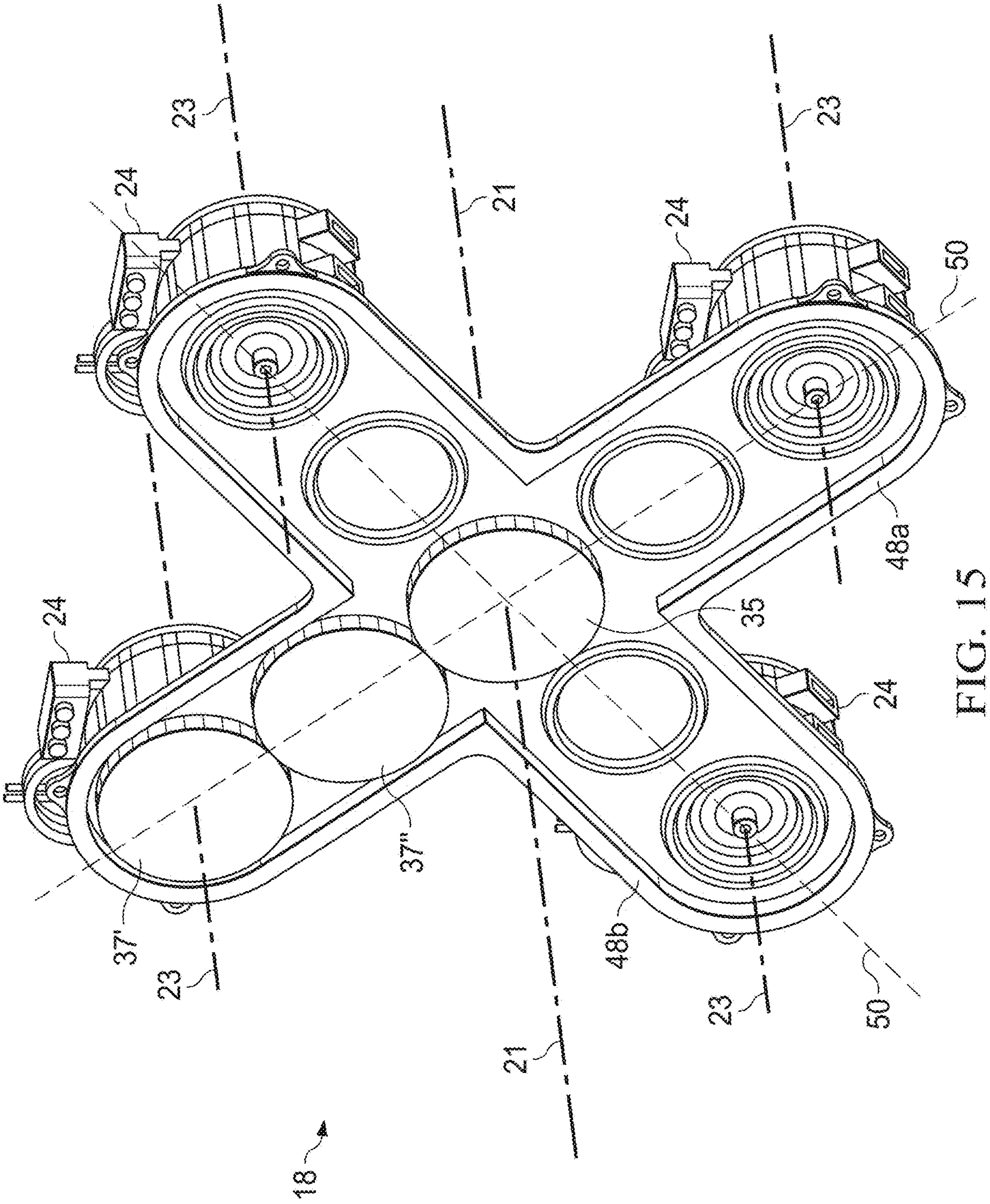
FIG. 15 illustrates one embodiment of an arrangement of electric generators disposed along the arms of a gearbox housing.
Figure 16:
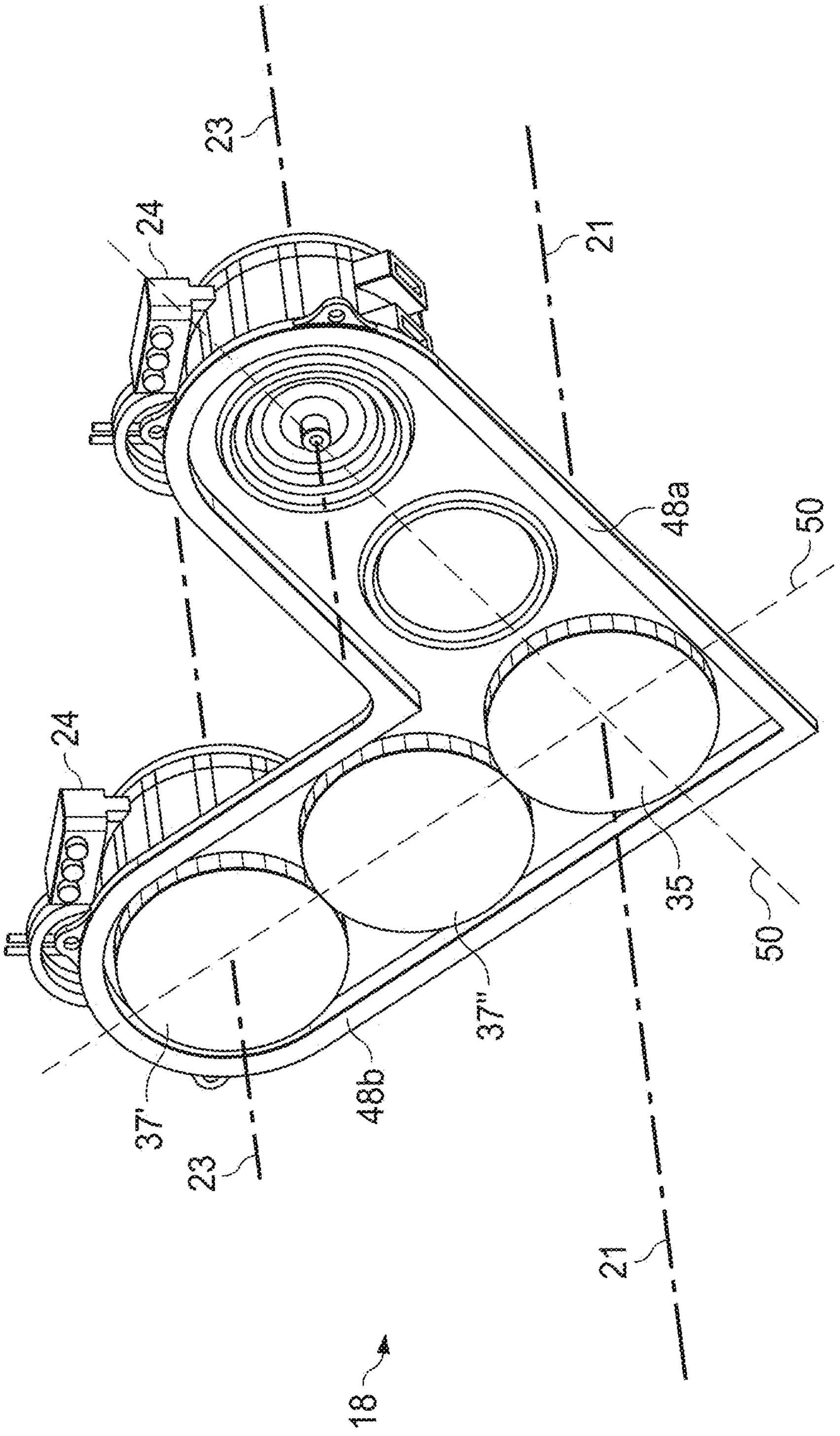
FIG. 16 illustrates another embodiment of an arrangement of electric generators disposed along the arms of a gearbox housing.

Although gearbox housing 38 is not limited to a particular shape, in some embodiments such as is shown, gearbox housing 38 includes at least one arm shaped portion 48 extending along an arm axis 50, as best seen in FIGS. 15 and 16, that extends radially outward from primary gear assembly axis 21. FIG. 15 illustrates two arm shaped portions 48*a*, 48*b*, each extending along an arm axis 50 where arm shaped portions 48*a*, 48*b* are perpendicular to one another about primary gear assembly axis 21 forming an "X" shape. Other embodiments of gearbox housing 38 may include only a single arm shaped portion 48. In yet other embodiments, arm shaped portions 48*a*, 48*b* may form a "V" shape relative to primary gear assembly axis 21 as shown in FIG. 16. In yet other embodiments, gearbox housing 38 enclosing drive gearset 35 and output gearset 37 may be circular in shape, such as is illustrated in FIG. 16. In one embodiment, each arm shaped portion 48 includes a proximal end 48' closer to primary gear assembly axis 21 and a distal end 48" with an electric generator 24 mounted adjacent the distal end 48" of the arm shaped portion 48.

In the illustrated embodiment of FIGS. 13-16, gearbox housing 38 has a first side 38' and second side 38' with a plurality of electric generators 24 mounted on each of the first side 38' and second side 38". Moreover, gearbox housing 38 may include an additional housing portion 38' adjacent first side 38' to enclose all or a portion of input drive gearset 35.

In one or more embodiments, sets of electric generators 24 oppose one another along any given gear assembly output driveshaft axis 23 so that a single driveshaft 22 (shown in dashed in FIG. 14) on which an output gearset 37 (shown in dashed in FIG. 14) is mounted may be utilized to provide driving input to both of the opposing electric generators 24 along the given gear assembly output driveshaft axis 23. For example, electric generators 24*b*, 24*c* and 24*e* are all mounted on the second side 38" of gearbox housing 38, while electric generators are 24*f*, 24*g* and 24*h* are all mounted on the first side 38' of gearbox housing 38 so that electric generators 24*b*, 24*c* and 24*e* oppose electric generators are 24*f*, 24*g* and 24*h* along their respective gear assembly output driveshaft axis 23. In other embodiments, generator assembly 16 may only include a plurality of electric generators 24 on one side of the gearbox housing 38.

In one or more embodiments where electric generators 24 are AC generators, generator assembly 16 may include a plurality of rectifiers 26. In keeping with the minimized footprint in some embodiments, each electric generator 24 may be electrically coupled to its own rectifier 26 and such rectifier may be mounted on the electric generator 24 or otherwise, supported by gearbox housing 38.

Figure 13:
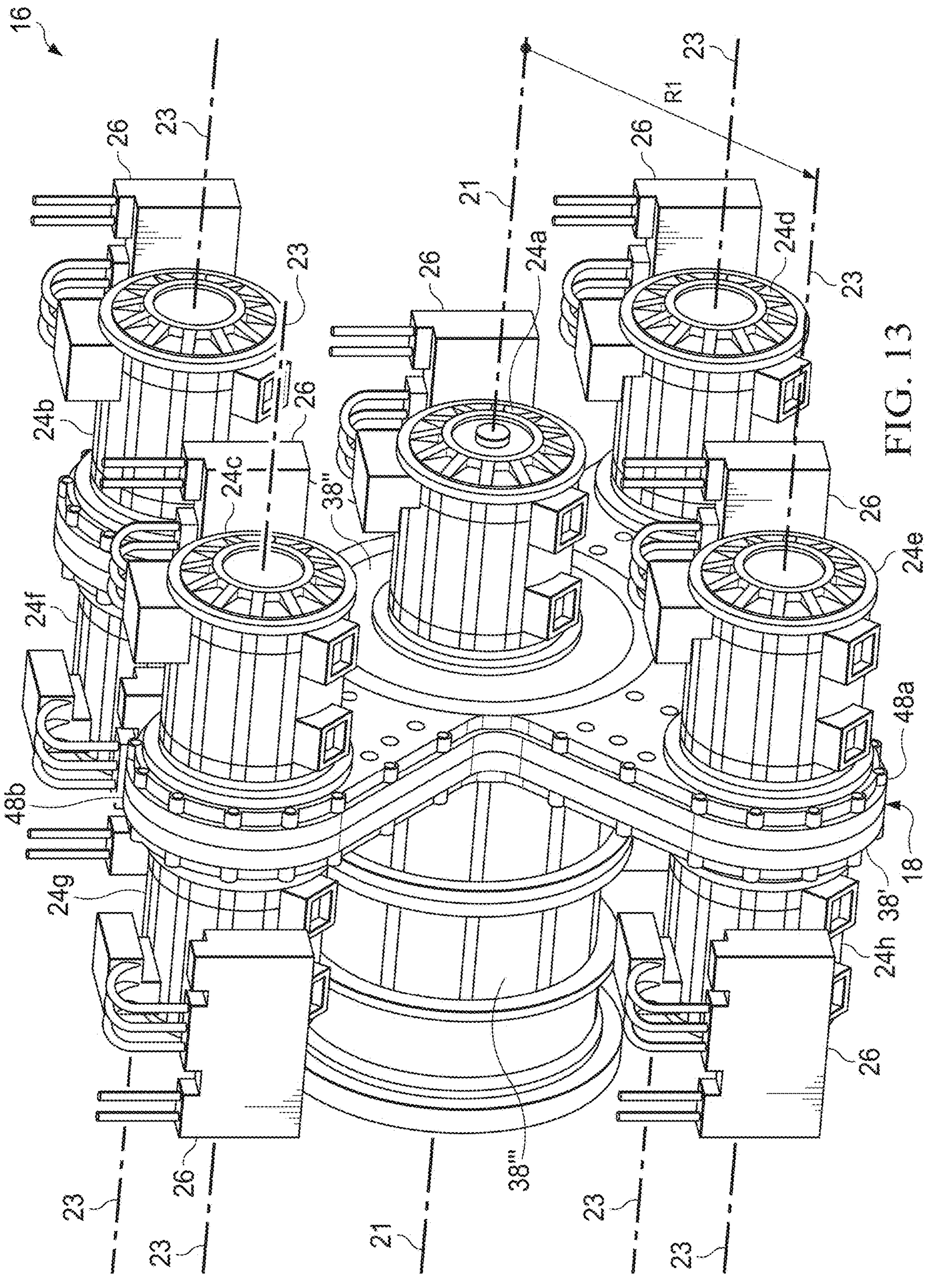
FIG. 13 is a perspective view of one embodiment of a generator assembly disposed to use a single prime mover to drive a plurality of electric generators in parallel.
Figure 14:
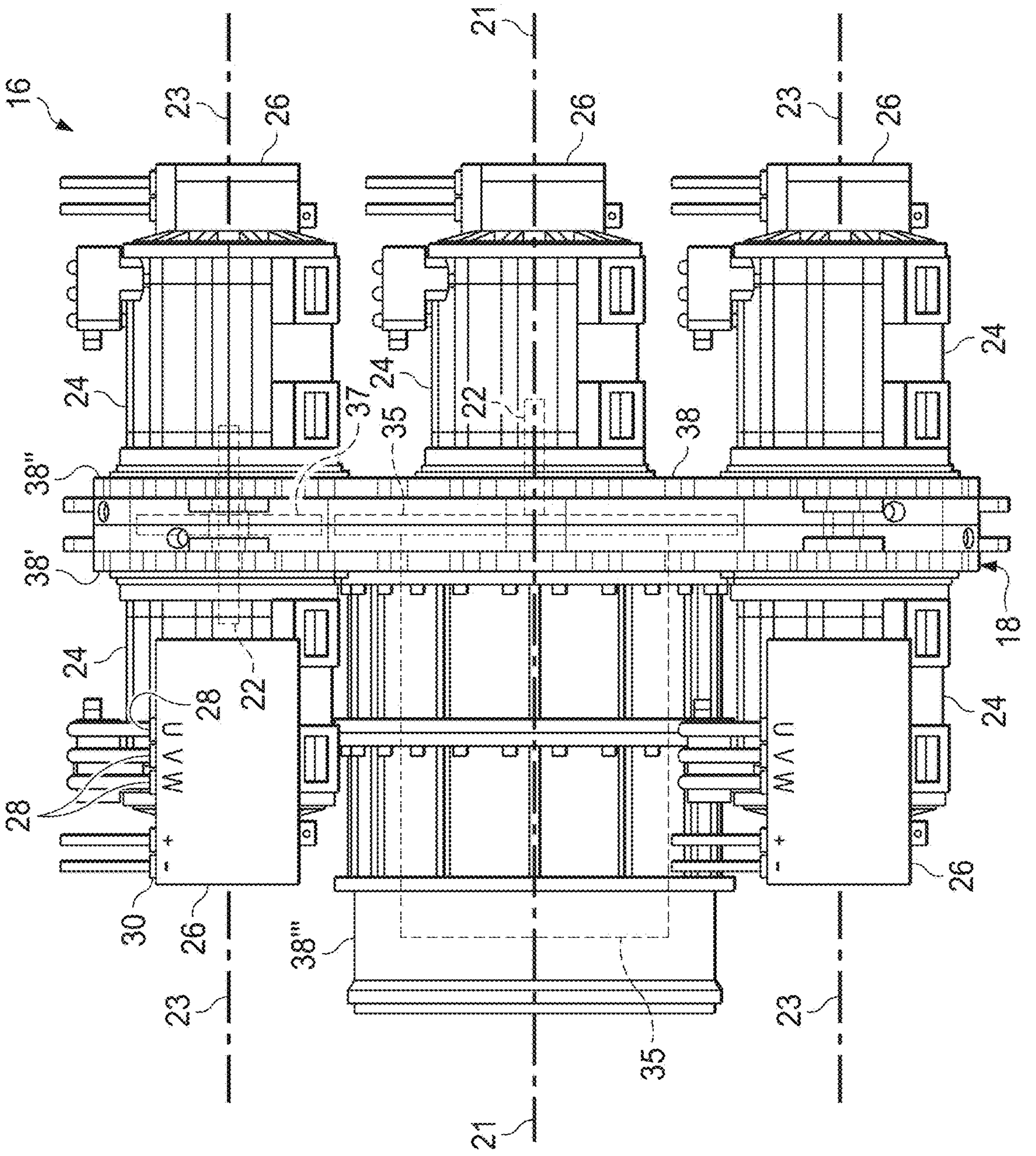
FIG. 14 is an elevation view of the generator assembly of FIG. 13

Although any of the electric generator 24 disclosed herein may be singe phase or three phase, FIGS. 13 and 14 shows a three phase electric generator where AC electrical input terminals 28 of rectifier 26 labeled as "U", "V" and "W" for the three AC phases. Electric DC output terminals 30 on each rectifier 26 are also shown.

FIGS. 15 and 16 each illustrate embodiments of possible arrangements of drive gearset 35 and an output gearset 37 within gear assembly 18. In the embodiment of FIG. 15, four electric generators 24 are shown mounted on an X-shaped gearbox housing 38, where each electric generator 24 is disposed along a gear assembly output driveshaft axis 23 that is spaced radially outward from primary gear assembly axis 21. In the embodiment of FIG. 16, two electric generators 24 are shown mounted on a V-shaped gearbox housing 38, where each electric generator 24 is disposed along a gear assembly output driveshaft axis 23 that is spaced radially outward from primary gear assembly axis 21. In each embodiment, drive gearset 35 is disposed along primary gear assembly axis 21. Output gearset 37 includes a driven gear 37' and an idler gear 37". It will be appreciated that this particular arrangement allows the size of gearbox housing 38 to be minimized and utilize smaller gears for drive gearset 35 and an output gearset 37. This arrangement is particularly useful for a gearbox housing 38 that includes one or more arm shaped portions 48. Thus, although gearbox housing 38 is not limited to a particular shape in some embodiments, in other embodiments such as is shown, gearbox housing 38 includes at least one arm shaped portion 48 extending along an arm axis 50. FIGS. 15 and 16 illustrate two arm shaped portions 48*a*, 48*b*, each extending along an arm axis 50 where arm shaped portions 48*a*, 48*b* are perpendicular to one another about primary gear assembly axis 21. Other embodiments of gearbox housing 38 may include only a single arm shaped portion 48. In yet other embodiments, gearbox housing 38 about drive gearset 35 and output gearset 37 may be circular in shape, such as is illustrated in FIG. 15, eliminating the need for an idler gear 37".

Figure 17:
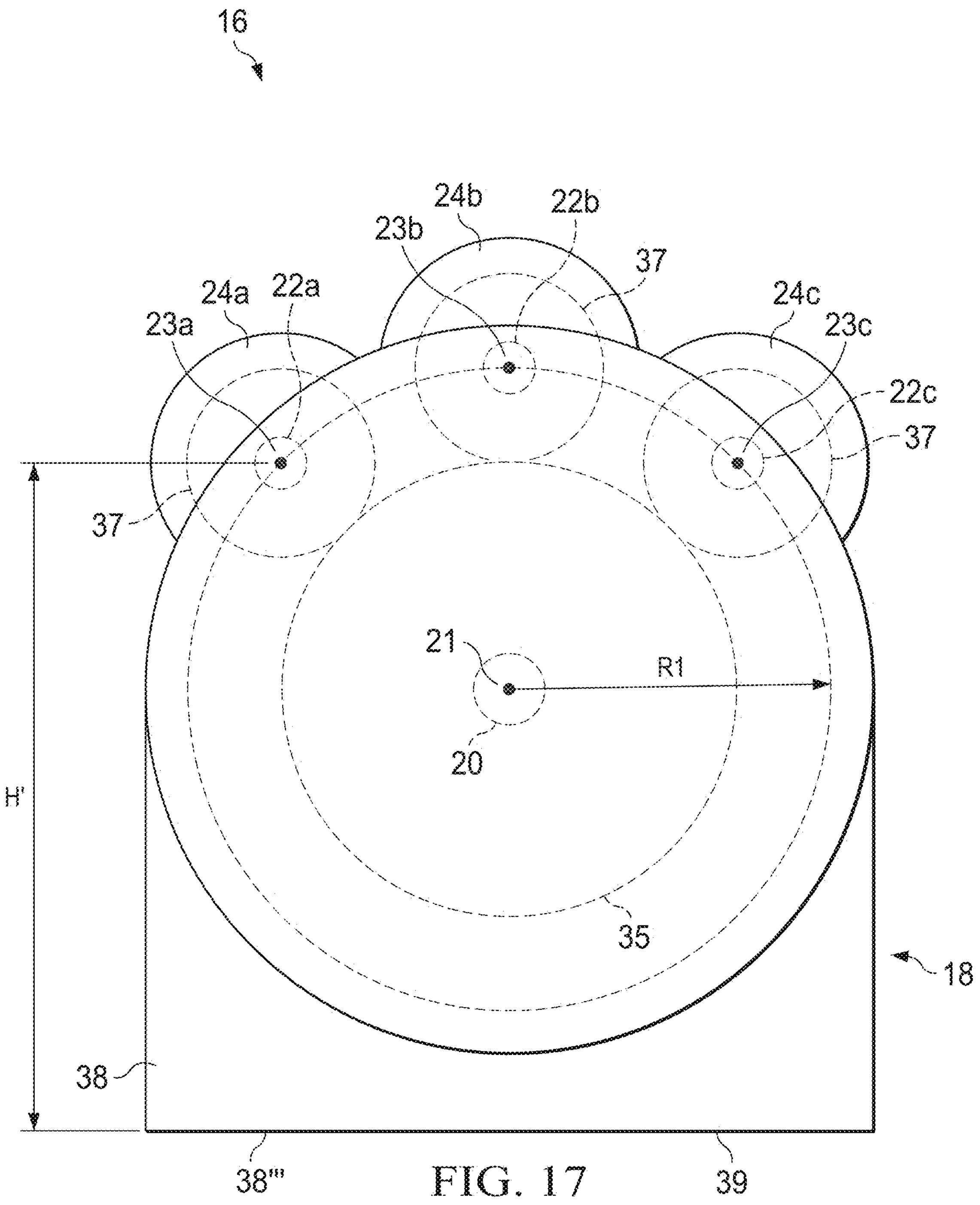
FIG. 17 illustrates an arrangement of electric generators supported on a gearbox housing above a primary gear assembly axis.
Figure 18:
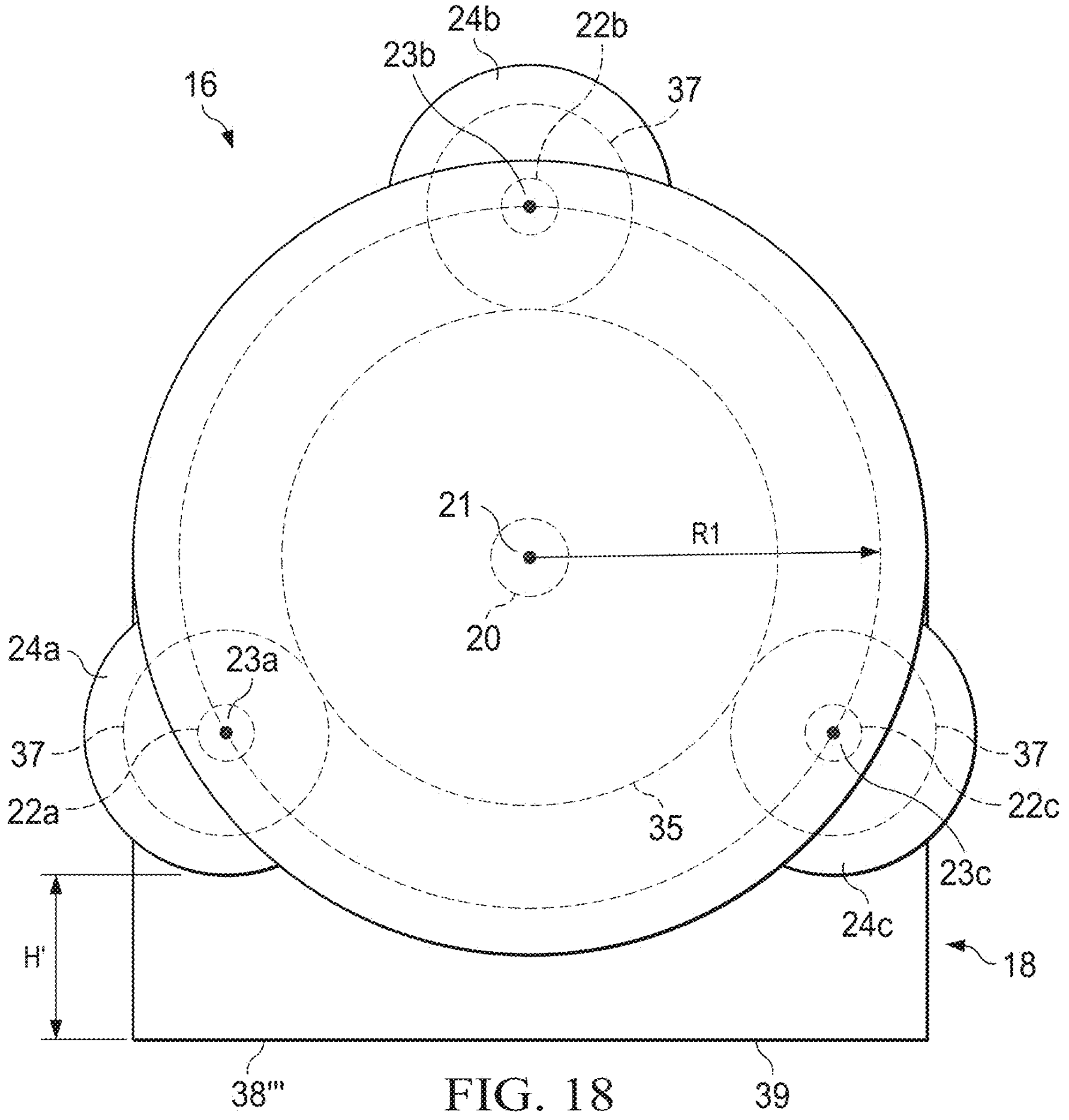
FIG. 18 illustrates an arrangement of three electric generators supported on a gearbox housing symmetrically about a primary gear assembly axis.
Figure 19:
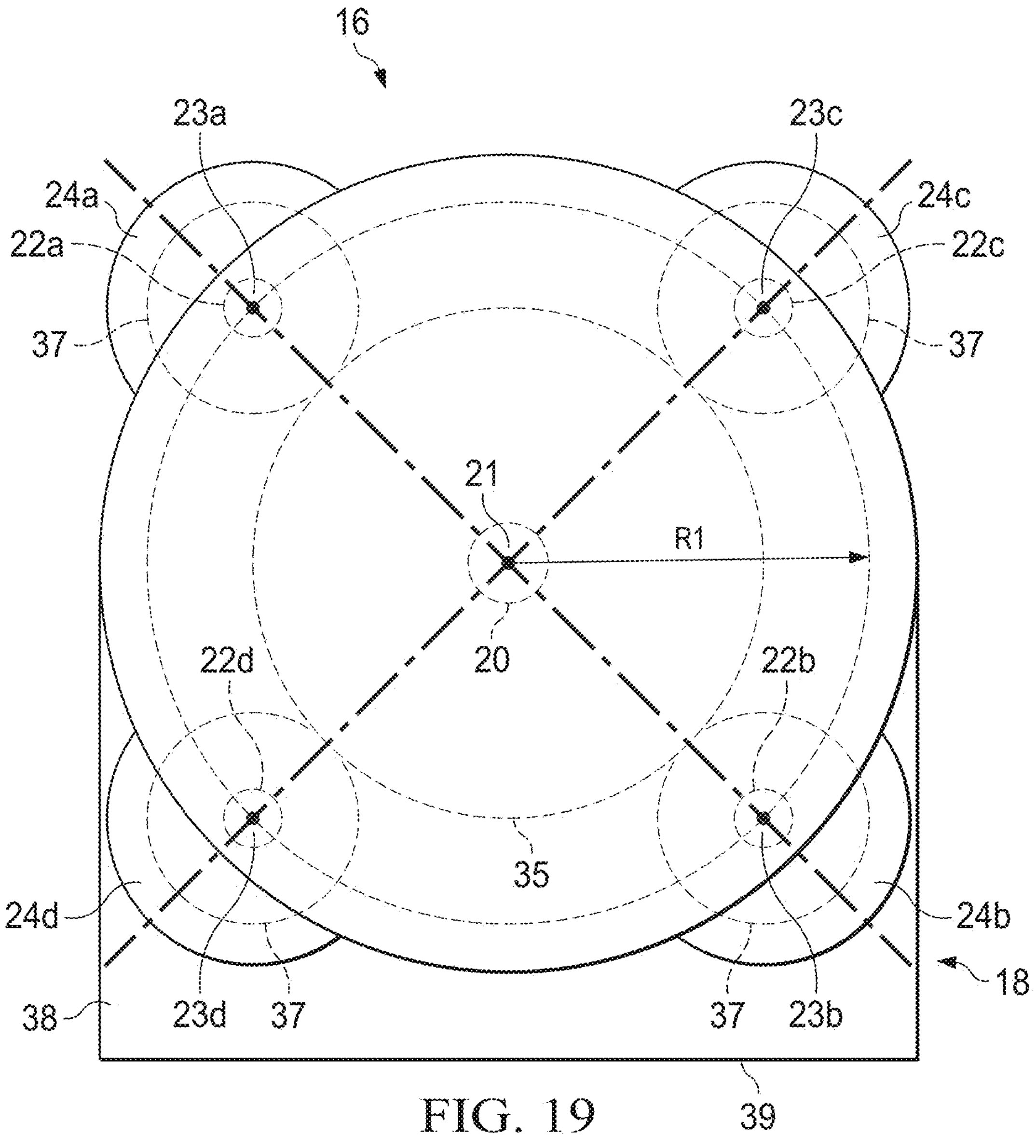
FIG. 19 illustrates an arrangement of four electric generators supported on a gearbox housing symmetrically about a primary gear assembly axis.

FIGS. 17-19 illustrate different configurations of electric generators 24 mounted on gearbox housing 38. In the illustrated embodiments, electric generators 24 are shown as spaced radially outward from primary gear assembly axis 21 the same distance R1, however, the disclosure is not limited to any particular outward spacing R1 for each individual electric generator 24 so long as a plurality of electric generators 24 are spaced outward from primary gear assembly axis 21. Thus, in some embodiments, the distance R1 for individual electric generators 24 could vary.

In any event, FIG. 17 illustrates a generator assembly 16 with a plurality of electric generators 24*a*, 24*b*, 24*c* supported by gear assembly 18. Gear assembly (18) has a gear assembly input driveshaft (20) extending along a primary gear assembly axis (21) for coupling to the output driveshaft 14 (not shown) of an engine 12 (not shown). In addition, gear assembly (18) also includes a plurality of gear assembly output driveshafts 22*a*, 22*b*, 22*c*, each output driveshaft 22 extending along its own gear assembly output driveshaft axis 23 that is parallel with, but spaced radially outward from the primary gear assembly axis 21 a distance R1.

Each gear assembly output driveshafts (22) is coupled to a separate one of the plurality of primary electric generators (24), thereby allowing the primary electric generators (24) to be operated in parallel. Specifically, gear assembly 18 includes an input or drive gearset 35 mounted on or otherwise coupled to the gear assembly input driveshaft (20) and meshed with a plurality of output gearsets 37. Each output gearset 37 is mounted on or otherwise coupled to a separate one of the output driveshaft (22) in order to drive the electric generator 24 to which the output driveshaft 22 is coupled.

In this embodiment, the plurality of primary electric generators (24) are spaced a distance of at least H' from the base 39 of gearbox housing 38. Moreover, the plurality of primary electric generators (24) are positioned asymmetrically about primary gear assembly axis 21. FIG. 18 illustrates three electric generators 24*a*, 24*b*, 24*c* symmetrically spaced about primary gear assembly axis 21. Similarly, FIG. 19 illustrates four electric generators 24*a*, 24*b*, 24*c*, 24*d* symmetrically spaced about primary gear assembly axis 21. Symmetrical spacing as illustrated in FIGS. 18 and 19 may be desirable when balancing the load placed on gear assembly 18, which may extend the operating life of generator assembly 16 by equally distributing the load on gear assembly input driveshaft (20) and drive gearset 35.

Figure 20:
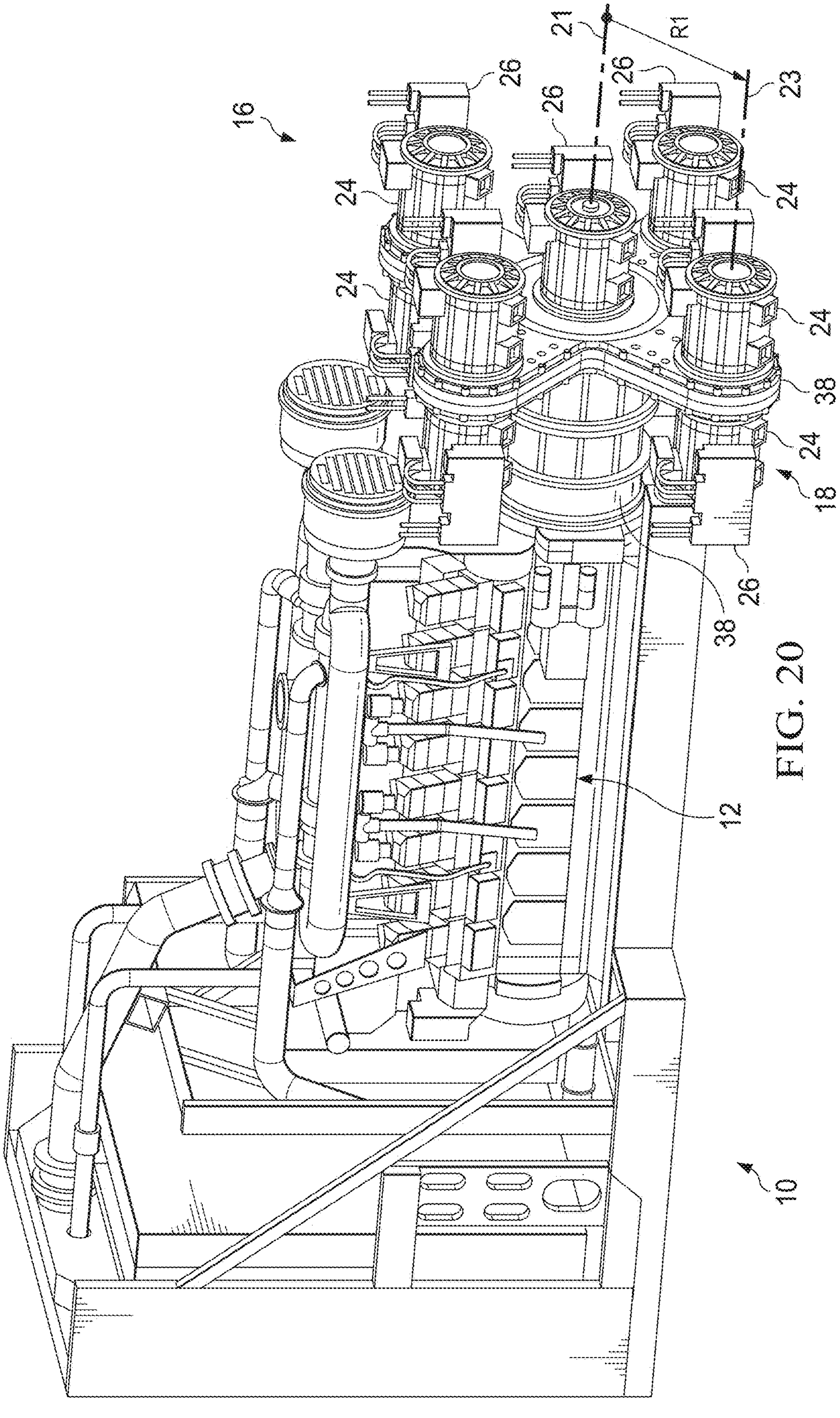
FIG. 20 is a perspective view of one embodiment of a power generation system with a prime mover disposed to drive a plurality of electric generators in parallel.

FIG. 20 is another embodiment of a power generation system (10) powered by a prime mover or engine (12) that drives a generator assembly (16) to produce electricity. Although engine 12 is not limited to a particular type of engine, in this embodiment, engine 12 is shown as a gas or diesel engine. Generator assembly 16 includes a gear assembly 18 and a plurality of primary electric generators (24). Gear assembly (18) is centered around a primary gear assembly axis (21). Each of the plurality of primary electric generators (24) are disposed along a gear assembly output driveshaft axis (23) that is parallel with, but spaced apart from primary gear assembly axis (21). In this regard, each gear assembly output driveshaft axis (23) along which a primary electric generators (24) is mounted is spaced radially outward from the primary gear assembly axis (21) a distance R1.

Each of the plurality of primary electric generators 24 shown in FIG. 20 can be an AC generator or a DC generator. In some embodiments, a portion of the plurality of primary electric generators 24 are AC generators and another portion of the plurality of primary electric generators 24 are DC generators. Where there is a desire to combine the AC signals from those primary electric generators 24 that are AC generators, the individual AC signals from each of the separate primary electric generators 24 must be synched. In such case, each of the primary electric generators 24 to be combined is electrically coupled to a rectifier 26 to convert the AC signals produced by the AC generators to a DC signal. The converted DC signals from a plurality of rectifiers 26 can then be combined and the combined DC signal can then be altered to a combined AC signal by an inverter (not shown), such as is described above.

Of course, where an electric generator 24 as described herein is a DC generator and an AC signal is desired, the DC signal from such electric generator 24 can be directed to an inverter for conversion of the DC signal to an AC signal.

It will be appreciated that the above-described power generation systems 10, by distributing the load among multiple electric generators, enhances overall efficiency compared to single generator systems. Additionally, scalability is achieved by adding or removing electric generators as needed, making power generation systems 10 easily adaptable to different power generation capacities. In addition, the plurality of electric generators can offer redundancy if one or more were to fail. Likewise, an electric generator can be taken off-line, such as for service, without impacting the overall electrical generation capacity of power generation systems 10.

For the avoidance of doubt, the gear assembly 18 as described functions to drive all of the plurality of electric generators 24 from a single prime mover 12. Moreover, in some embodiments, the gear assembly 18 supports all of the plurality of electric generators 24 on a gearbox housing 38 so as to reduce the overall footprint of the power generation system 10. It will be appreciated in this regard that in one or more embodiments, each of the electric generators can have a typical output of 400 kW and 3800 Nm.

As used herein, gearset means one or more gears, and may include a spur gear, a planetary gearset, or other types of gears. As used herein, a driveshaft may include one or more shafts interconnected to one another.

The electric power generation system finds utility in diverse applications including but not limited to i) standalone power generation for remote locations or mobile units; ii) integration with renewable energy sources for hybrid power generation systems; iii) backup power generation systems for critical infrastructure; and iv) industrial applications requiring high reliability and efficiency such as subterranean activities like hydraulic fracturing.

Advantages of the electric power generation system include i) enhanced efficiency, whereby distributed load handling and optimized electric generator operation leads to improved energy conversion efficiency; ii) flexibility, with the ability to operate with various mechanical inputs and adapt to fluctuating power demands; iii) reliability, with redundancy and fault-tolerant features to ensure continuous operation even in challenging conditions; and iv) the potential for reducing carbon footprint by integrating with renewable energy sources effectively.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A power generation system comprising:

a gear assembly having a gear assembly input driveshaft disposed along a primary gear assembly axis with an input gearset coupled to the input driveshaft, and a plurality of gear assembly output driveshafts, each of the plurality of gear assembly output driveshafts coupled to a separate output gearset with each of the output gearsets meshed with the input gearset, wherein each of the plurality of output shafts is parallel with, but spaced radially outward from the primary gear assembly axis;

an engine having an engine output driveshaft coupled to the gear assembly input driveshaft;

a gearbox housing enclosing the input gearset and all of the output gearsets, the gearbox housing having a first exterior side and an opposing second exterior side, where the first exterior side and second exterior side are each perpendicular to primary gear assembly axis;

a plurality of primary electric generators, each electric generator removably mounted on one of the first exterior side or second exterior side of the gearbox housing allowing said electric generator to be individually maintained or taken off-line without impacting operation of the power generation system, each electric generator mechanically coupled to a separate one of the plurality of gear assembly output driveshafts of the gear assembly, wherein each electric generator includes an electrical output terminal; and a platform having an upper platform bed surface with the engine and the gearbox mounted on the upper platform bed surface.

2. The power generation system of claim 1, further comprising an additional primary electric generator disposed along the primary gear assembly axis and coupled to the input gearset.

3. The power generation system of claim 1, further comprising an engagement mechanism disposed along each of a plurality of gear assembly output driveshafts to allow each of the plurality of primary electric generators to be engaged and disengaged from the gear assembly during operation of the power generation system.

4. The power generation system of claim 1, wherein each of the plurality of gear assembly output driveshafts is of the same length.

5. The power generation system of claim 1, wherein each of the plurality of primary electric generators is disposed in a plane that is perpendicular to the primary gear assembly axis.

6. The power generation system of claim 1, wherein each of the plurality of gear assembly output driveshafts is spaced apart from the primary gear assembly axis the same distance.

7. The power generation system of claim 1, wherein each of the plurality of gear assembly output driveshafts is symmetrically spaced about the primary gear assembly axis.

8. The power generation system of claim 1, wherein each of the plurality of primary electric generators is mounted on the gearbox housing so as to be spaced apart above the skid bed surface.

9. The power generation system of claim 1, wherein each of the plurality of primary electric generators is a stand-alone assembly having its own electric generator housing with its own rectifier mounted thereon.

10. The power generation system of claim 1, wherein a first portion of the electric generators are AC electric generators and a second portion of the plurality of electric generators are DC electric generators.

11. The power generation system of claim 1, further comprising a separate inverter mounted on each primary electric generator.

12. The power generation system of claim 1, wherein the skid is a trailer.

13. The power generation system of claim 1, wherein each of the plurality of gear assembly output driveshafts extends along a separate output driveshaft axis, and wherein at least two of the plurality of primary electric generators are disposed along the same output driveshaft axis in series.

14. A power generation system comprising:

an engine having an engine output driveshaft;

a trailer having an upper trailer bed surface with the engine mounted on the upper trailer bed surface;

a generator assembly coupled to the output shaft of the engine, the generator assembly comprising:

a gearbox housing mounted on the upper trailer bed surface, the gearbox housing having a first exterior side and an opposing second exterior side, where the first exterior side and the second exterior side are parallel with one another;

a gear assembly input driveshaft disposed along a primary gear assembly axis, the input driveshaft extending from the gearbox housing and coupled to the output shaft of the engine;

a drive gearset coupled to the input driveshaft and enclosed within the gearbox housing;

at least three gear assembly output driveshafts, each of the at least three gear assembly output driveshafts coupled to a separate output gearset with each of the output gearsets enclosed within the gearbox housing and meshed with the drive gearset, wherein each of the at least three output driveshafts are parallel with, but spaced radially outward from the primary gear assembly axis;

at least three primary stand-alone electric generators, each stand-alone electric generator having its own electric generator housing separate from and spaced apart from the housings of the other stand-alone electric generators and each electric generator mechanically coupled to a separate one of the output driveshafts of the gear assembly, wherein each electric generator is mounted on an exterior side of the gearbox housing allowing said electric generator to be individually maintained or taken off-line without impacting operation of the power generation system.

15. The power generation system of claim 14, wherein the at least three primary electric generators each have its own rectifier mounted on the electric generator.

16. The power generation system of claim 14, wherein the at least three primary electric generators are each mounted on the second side; and wherein each of the at least three gear assembly output driveshafts extends along a separate output driveshaft axis, the power generation system further comprising at least three opposing electric generators, where each opposing electric generator is disposed along a separate one of the at least three gear assembly output driveshafts and each opposing electric generator is mounted on the first side of the gearbox housing.

17. The power generation system of claim 14, wherein the at least three primary electric generators are mounted on the gearbox housing so as to be spaced apart from the upper trailer bed surface above-the upper trailer bed surface supporting the gearbox housing.

18. The power generation system of claim 14, wherein the at least three primary electric generators comprises eight electric generators, each mechanically coupled to a gear assembly output driveshaft that is parallel with, but spaced radially outward from the primary gear assembly axis.

19. A power generation system comprising:

an engine having an engine output driveshaft;

a generator assembly coupled to the output shaft of the engine, the generator assembly comprising:

a gearbox housing;

a gear assembly input driveshaft disposed along a primary gear assembly axis, the input driveshaft extending from the gearbox housing and coupled to the output shaft of the engine;

a drive gearset coupled to the input driveshaft and enclosed within the gearbox housing;

at least three gear assembly output driveshafts, each of the at least three gear assembly output driveshafts coupled to a separate output gearset with each of the output gearsets enclosed within the gearbox housing and meshed with the drive gearset, wherein each of the at least three output driveshafts are parallel with, but spaced radially outward from the primary gear assembly axis;

at least three primary electric generators, each electric generator mechanically coupled to a separate one of the output driveshafts of the gear assembly, wherein the gearbox housing includes at least a first arm shaped portion and a second arm shaped portion each extending away from primary gear assembly axis, the arm shaped portions each enclosing one or more output gearsets, with at least one of the at least three electric generators mounted along each arm shaped portion.

20. The power generation system of claim 19, wherein the first arm shaped portion and the second arm shaped portion together form an X shape about primary gear assembly axis.

21. The power generation system of claim 20, further comprising an additional primary electric generator disposed along a primary gear assembly axis and coupled to the drive gearset.

22. A power generation system comprising:

an engine having an engine output driveshaft;

a generator assembly coupled to the output shaft of the engine, the generator assembly comprising:

a gearbox housing having a first exterior side and an opposing second exterior side, where the first exterior side and second exterior side are parallel with one another;

a gear assembly input driveshaft disposed along a primary gear assembly axis with an input gearset coupled to the input driveshaft and enclosed within the gearbox housing;

at least four gear assembly output driveshafts, each of the at least four gear assembly output driveshafts extending along a separate output driveshaft axis and each of the at least four gear assembly output driveshafts coupled to a separate output gearset enclosed within the gearbox housing with each of the output gearsets meshed with the drive gearset, wherein each of the at least four output shafts is parallel with, but spaced radially outward from the primary gear assembly axis;

at least one electric generator mechanically coupled each of the at least four gear assembly output driveshafts, each electric generator being a stand-alone electric generator having its own electric generator housing separate from the gearbox housing and separate from and spaced apart from the housings of the other stand-alone electric generators, allowing said electric generator to be individually maintained or taken off-line without impacting operation of the power generation system;

a separate inverter mounted on each of the electric generator housings;

an engagement mechanism disposed along each of the output driveshafts to allow each electric generator to be engaged and disengaged from its output gearset during operation of the power generation system; and a platform supporting the engine and gearbox housing, wherein the platform comprises a bed and at least a portion of the electric generators are spaced apart from the platform above the platform bed.

23. The power generation system of claim 22, further comprising an additional primary electric generator disposed along a primary gear assembly axis and coupled to the drive gearset.

24. The power generation system of claim 22, further comprising two electric generators disposed along each output driveshaft axis.

25. The power generation system of claim 24, wherein each gear assembly output driveshaft has a first end and a second end, and wherein one of the two electric generators disposed along each output driveshaft axis is coupled to the first end and the other of the two electric generators disposed along each output driveshaft axis is coupled to the second end.

26. The power generation system of claim 25, further comprising an additional primary electric generator disposed along a primary gear assembly axis and coupled to the drive gearset.

27. The power generation system of claim 26, wherein a first portion of the electric generators are AC generators and a second portion of the electric generators are DC generators.

28. The power generation system of claim 26, wherein the input driveshaft extends from the first side, wherein a first portion of the electric generators are mounted on the first side and wherein a second portion of the electric generators are mounted on the second side.

* * * * *